US00RE46251E

(19) United States
(12) Reissued Patent
Chappa et al.

(10) Patent Number: US RE46,251 E
(45) Date of Reissued Patent: Dec. 27, 2016

(54) ADVANCED COATING APPARATUS AND METHOD

(75) Inventors: Ralph A. Chappa, Ham Lake, MN (US); Mark F. Carlson, St. Louis Park, MN (US)

(73) Assignee: Surmodics, Inc., Eden Prairie, MN (US)

(21) Appl. No.: 13/588,125

(22) Filed: Aug. 17, 2012

Related U.S. Patent Documents

Reissue of:
(64) Patent No.: 7,776,382
Issued: Aug. 17, 2010
Appl. No.: 11/388,478
Filed: Mar. 24, 2006

U.S. Applications:
(62) Division of application No. 10/256,349, filed on Sep. 27, 2002, now Pat. No. 7,192,484.

(51) Int. Cl.

| | |
|---|---|
| ***B05D 1/02*** | (2006.01) |
| ***B05D 1/40*** | (2006.01) |
| ***B05C 13/00*** | (2006.01) |
| ***B05B 13/04*** | (2006.01) |
| ***B05B 7/08*** | (2006.01) |
| ***B05D 1/00*** | (2006.01) |
| *B05B 13/02* | (2006.01) |

(52) U.S. Cl.
CPC ..... *B05B 7/0807* (2013.01); *B05B 7/0861* (2013.01); *B05B 13/0228* (2013.01); *B05B 13/0436* (2013.01); *B05B 13/0442* (2013.01); *B05D 1/002* (2013.01); *B05D 1/02* (2013.01); *B05B 7/0869* (2013.01); *B05B 13/0207* (2013.01)

(58) Field of Classification Search
USPC ..... 427/2.1, 2.24, 2.25
See application file for complete search history.

(56) References Cited

U.S. PATENT DOCUMENTS

| | | | | |
|---|---|---|---|---|
| 1,866,100 | A | 7/1932 | Hach | |
| 2,330,800 | A | 10/1943 | Gladfelter et al. | |
| 2,330,880 | A | 10/1943 | Gladfelter et al. | |
| 3,935,896 | A | 2/1976 | Tegtmeier et al. | |
| 3,963,069 | A | 6/1976 | Marti et al. | |
| 4,051,805 | A | 10/1977 | Waldrum | |
| 4,073,335 | A | 2/1978 | Fort et al. | |
| 4,075,975 | A | 2/1978 | Oswald | |
| 4,153,201 | A | 5/1979 | Berger et al. | |
| 4,240,373 | A * | 12/1980 | Anger | 118/301 |
| 4,289,089 | A | 9/1981 | Tacke et al. | |
| 4,301,968 | A | 11/1981 | Berger et al. | |
| 4,337,896 | A | 7/1982 | Berger et al. | |
| 4,352,459 | A | 10/1982 | Berger et al. | |

(Continued)

FOREIGN PATENT DOCUMENTS

| | | |
|---|---|---|
| CA | 2 351 016 | 12/2001 |
| DE | 33 35 502 | 3/1985 |

(Continued)

*Primary Examiner* — Ling Xu
(74) *Attorney, Agent, or Firm* — Kagan Binder, PLLC

(57) ABSTRACT

A method for coating a rollable device including a device rotator having a pair of rollers and spray nozzle is described. The spray nozzle produces a spray of coating material that is directed towards a gap that is between the rollers of the pair. The majority of any spray not deposited on the rollable device during a coating process passes through the gap between the rollers.

26 Claims, 13 Drawing Sheets

(56) References Cited

U.S. PATENT DOCUMENTS

| | | | | |
|---|---|---|---|---|
| 4,375,820 | A | 3/1983 | Vinarcsik et al. | |
| 4,541,564 | A | 9/1985 | Berger et al. | |
| 4,567,934 | A | 2/1986 | Nakao et al. | |
| 4,572,451 | A | 2/1986 | Ikeda et al. | 242/527.3 |
| 4,638,045 | A | 1/1987 | Kohn et al. | |
| 4,655,393 | A | 4/1987 | Berger | |
| 4,723,708 | A | 2/1988 | Berger et al. | |
| 4,978,067 | A | 12/1990 | Berger et al. | |
| 5,102,402 | A | 4/1992 | Dror et al. | |
| 5,183,509 | A | 2/1993 | Brown et al. | |
| 5,219,120 | A | 6/1993 | Ehrenberg et al. | |
| 5,387,247 | A | 2/1995 | Vallana et al. | |
| 5,413,638 | A | 5/1995 | Bernstein, Jr. et al. | |
| 5,464,650 | A | 11/1995 | Berg et al. | |
| 5,501,735 | A | 3/1996 | Pender | |
| 5,527,389 | A * | 6/1996 | Rosenblum et al. | 118/58 |
| 5,643,362 | A | 7/1997 | Garves | |
| 5,658,387 | A * | 8/1997 | Reardon et al. | 118/323 |
| 5,833,891 | A | 11/1998 | Subramaniam et al. | |
| 5,837,008 | A | 11/1998 | Berg et al. | |
| 5,897,911 | A | 4/1999 | Loeffler | |
| 6,153,252 | A | 11/2000 | Hossainy et al. | |
| 6,156,373 | A | 12/2000 | Zhong et al. | |
| 6,203,551 | B1 | 3/2001 | Wu | |
| 6,254,921 | B1 | 7/2001 | Chappa et al. | |
| 6,322,847 | B1 | 11/2001 | Zhong et al. | |
| 6,333,595 | B1 | 12/2001 | Horikawa et al. | |
| 6,345,630 | B2 | 2/2002 | Fishkin et al. | |
| 6,358,556 | B1 | 3/2002 | Ding et al. | |
| 6,368,658 | B1 | 4/2002 | Schwarz et al. | |
| 6,395,326 | B1 | 5/2002 | Castro et al. | 427/2.24 |
| 6,406,754 | B2 | 6/2002 | Chappa et al. | |
| 6,431,770 | B1 | 8/2002 | Kurematsu et al. | 396/612 |
| 6,506,437 | B1 | 1/2003 | Harish et al. | |
| 6,517,889 | B1 | 2/2003 | Jayaraman | |
| 6,527,863 | B1 | 3/2003 | Pacetti et al. | |
| 6,544,223 | B1 | 4/2003 | Kokish | |
| 6,544,582 | B1 | 4/2003 | Yoe | |
| 6,555,157 | B1 | 4/2003 | Hossainy | |
| 6,562,136 | B1 | 5/2003 | Chappa et al. | |
| 6,565,659 | B1 | 5/2003 | Pacetti et al. | |
| 6,572,644 | B1 | 6/2003 | Moein | |
| 6,605,154 | B1 | 8/2003 | Villareal | |
| 6,607,598 | B2 | 8/2003 | Schwarz et al. | |
| 6,616,765 | B1 | 9/2003 | Castro et al. | |
| 6,645,547 | B1 | 11/2003 | Shekalim et al. | |
| 6,669,980 | B2 | 12/2003 | Hansen | |
| 6,673,154 | B1 | 1/2004 | Pacetti et al. | |
| 6,676,987 | B2 | 1/2004 | Zhong et al. | |
| 6,695,920 | B1 | 2/2004 | Pacetti et al. | 118/500 |
| 6,709,514 | B1 | 3/2004 | Hossainy | |
| 6,709,712 | B2 | 3/2004 | Chappa et al. | |
| 6,725,901 | B1 | 4/2004 | Kramer et al. | |
| 6,730,349 | B2 | 5/2004 | Schwarz et al. | |
| 6,743,462 | B1 | 6/2004 | Pacetti | |
| 6,743,463 | B2 | 6/2004 | Weber et al. | |
| 6,783,793 | B1 | 8/2004 | Hossainy et al. | |
| 6,803,070 | B2 | 10/2004 | Weber | |
| 6,818,247 | B1 | 11/2004 | Chen et al. | |
| 6,821,549 | B2 | 11/2004 | Jayaraman | |
| 6,887,510 | B2 | 5/2005 | Villareal | |
| 6,984,411 | B2 | 1/2006 | Palasis et al. | |
| 7,048,962 | B2 | 5/2006 | Shekalim et al. | |
| 7,125,577 | B2 | 10/2006 | Chappa | |
| 7,163,715 | B1 | 1/2007 | Kramer | |
| 7,611,532 | B2 | 11/2009 | Kramer | |
| 2001/0001824 | A1 | 5/2001 | Wu | |
| 2002/0051730 | A1 | 5/2002 | Bodnar et al. | |
| 2002/0094440 | A1 | 7/2002 | Llanos et al. | |
| 2002/0103526 | A1 | 8/2002 | Steinke | |
| 2002/0115400 | A1 | 8/2002 | Skrmetta | |
| 2002/0155212 | A1 | 10/2002 | Hossainy | |
| 2003/0003221 | A1 | 1/2003 | Zhong et al. | |
| 2003/0044514 | A1 | 3/2003 | Richard | |
| 2003/0054090 | A1 | 3/2003 | Hansen | |
| 2003/0059520 | A1 | 3/2003 | Chen et al. | |
| 2003/0088307 | A1 | 5/2003 | Shulze et al. | |
| 2003/0113439 | A1 | 6/2003 | Pacetti et al. | |
| 2003/0150380 | A1 | 8/2003 | Yoe | |
| 2003/0157241 | A1 | 8/2003 | Hossainy et al. | |
| 2004/0062875 | A1 | 4/2004 | Chappa et al. | |
| 2004/0073298 | A1 | 4/2004 | Hossainy | |
| 2004/0081745 | A1 | 4/2004 | Hansen | |
| 2004/0161547 | A1 | 8/2004 | Carlson et al. | |
| 2004/0185168 | A1 | 9/2004 | Weber et al. | |
| 2005/0098097 | A1 | 5/2005 | Chen et al. | |
| 2006/0088653 | A1 | 4/2006 | Chappa | |
| 2006/0110209 | A1 | 5/2006 | Shekalim et al. | |

FOREIGN PATENT DOCUMENTS

| | | |
|---|---|---|
| DE | 33 35 502 C1 | 3/1985 |
| WO | WO 00/01322 | 1/2000 |
| WO | WO 01/32382 | 5/2001 |
| WO | WO 01/32382 A1 | 5/2001 |
| WO | WO 02/20174 | 3/2002 |
| WO | WO 02/20174 A1 | 3/2002 |
| WO | WO 03/004072 | 1/2003 |
| WO | WO 03/004072 A2 | 1/2003 |
| WO | WO 2004/028579 | 4/2004 |
| WO | WO 2004/028699 | 4/2004 |
| WO | WO 2004/037443 | 5/2004 |
| WO | WO 2004/037443 A1 | 5/2004 |

* cited by examiner

ADVANCED COATING APPARATUS AND METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This divisional patent application is entitled to the benefit of priority, under 35 U.S.C. §§120 and 121, of the filing date of commonly-owned U.S. Nonprovisional patent application Ser. No. 10/256,349, now U.S. Pat. No. 7,192,484, filed Sep. 27, 2002, and titled ADVANCED COATING APPARATUS AND METHOD, the entire contents of which are incorporated herein by reference.

FIELD OF THE INVENTION

The invention relates to a coating apparatus and methods for disposing a coating material on a device. More specifically, the invention relates to the spray coating of a rollable device having a surface geometry, such as a medical device having a cylindrical shape.

BACKGROUND OF THE INVENTION

Medical devices are becoming increasingly complex in terms of function and geometry. It has been recognized that imparting desirable properties to the surface of medical devices, in particular small implantable medical devices, by coating the surface of the device with one or more compounds can enhance the function and effectiveness of the medical device. Traditional coating methods, such as dip coating, are often undesirable for coating these complex geometries since coating solution may get entrapped in the device structure. This entrapped solution may cause webbing or bridging of the coating solution and may hinder the device from functioning properly.

Spray coating techniques have also been used to apply coating material to various devices, including medical devices. However, current methods of spray coating these devices are often problematic and result in reduced coating consistency and reduced coating efficiency. One problem associated with spray coating techniques is related to excess spray, or "overspray", that is deposited on non-target locations during the coating process. Overspray can result in wasting of the coating material and can also lend to inaccuracies and defects during the process. This problem often occurs when small devices are coated, in particular small medical devices, such as stents and catheters.

Inaccuracies in the coating process can also be manifested in variable amounts of the coated material being deposited on the surface of the device. When a pharmaceutical agent is included in the coating material, it is often necessary to deliver precise amounts of the agent to the surface of the device to ensure that a subject receiving the coated device receives a proper dose of the agent. It has been difficult to achieve a great degree of accuracy using traditional coating methods and machines.

The drying of the applied coating and the manipulation of the devices after application of a coating can also be problematic aspects of the coating process, particularly processes that involve the coating of devices having multidimensional surfaces. Typically, a coating process involves repetitively applying a coating material to a fixtured device in order to achieve a target quantity and quality of coated material. Devices are often manipulated between the applications of the coating material and dried to a certain extent before these manipulations are performed. The drying of applied coatings and manipulation of the device can lead to defects in the coating on the device and can also lead to an increased time for the coating procedure.

Accordingly, there is a need for new equipment and methods useful for overcoming the problems associated with the spray coating procedures, in particular, the spray coating of small medical devices.

SUMMARY

In one aspect, the invention provides a coating apparatus for coating a reliable device that includes a device rotator and a spray nozzle. The device rotator includes a pair of rollers suitable for holding a rollable device, the pair having first and second roller that are arranged substantially parallel to each other and are separated by a gap. The spray nozzle is operationally arranged to produce spray of a coating material that is directed at the gap and, when the device is not positioned on the pair of rollers, arranged so the majority of the spray is passed through the gap. In another aspect, the spray nozzle is operationally arranged to produce a spray of coating material having a narrow spray pattern. The narrow spray pattern is such that width of the spray pattern at the gap is not greater than 150% of the width of the gap itself.

In another aspect, the spray nozzle of the coating apparatus is angled relative to the axis of the first or second roller. In this embodiment the spray nozzle is angled less than 90° but greater than 5° relative to the axis of the first or second roller.

In yet other aspects of the invention, the coating apparatus includes rollers that have one or more ribs. The ribs can be spaced along the roller and preferably have a shape that is more narrow further from the center of the roller.

The coating apparatus also includes a roller drive mechanism that can drive rotation of the first and second roller. In some cases more than one pair of rollers are attached to a tray and the pairs of rollers are commonly driven by a continuous drive member.

In another aspect, the spray nozzle of the coating apparatus is movable. The spray nozzle can be movable in a direction that is parallel to the rollers and also in a direction that is perpendicular to the rollers.

In one preferred aspect of the invention, the coating apparatus includes a spray nozzle which has a sonicating member. The sonicating member can produce a spray of coating material having a narrow pattern. The narrow spray pattern can be established by the flow of gas through and out of a channel in the sonicating member.

The invention also provides methods for coating a rollable device using the coating apparatus as described. Generally, a rollable device is placed on the device rotator, in contact with the first roller and the second roller. A coating material is then disposed on the device from a spray nozzle, the spray being directed towards the gap. The majority of any spray that does not get deposited on the device is passed through the gap. The device can then be rotated by rotation of the rollers to position a different portion of the device for subsequent application of a coating material. The coating process is particularly suitable for small rollable devices, for example, small medical devices such as catheters and stents that have a cylindrical shape. A variety of coating materials can be applied to the device; particularly useful materials include polymeric, photoactivatable, and biologically or pharmaceutically active compounds, or combinations thereof.

In one preferred aspect of the coating process, the spray nozzle is moved along the length of the roller. In this aspect, the step of disposing the coating material and moving the spray nozzle are performed simultaneously.

In one aspect, rotation of the rollable device is performed by indexing the rollers. The rollers can be coupled to a roller drive mechanism which can drive the indexing function. In a preferred embodiment, the rollers are randomly indexed after depositing a coating material on the rollable device. This process can be repeated as needed.

Rotation of the device takes place before the applied coating material has dried. In this aspect, the coating process can be performed very rapidly, as compared to traditional methods.

DETAILED DESCRIPTION OF THE INVENTION

Overview

Figure 1:
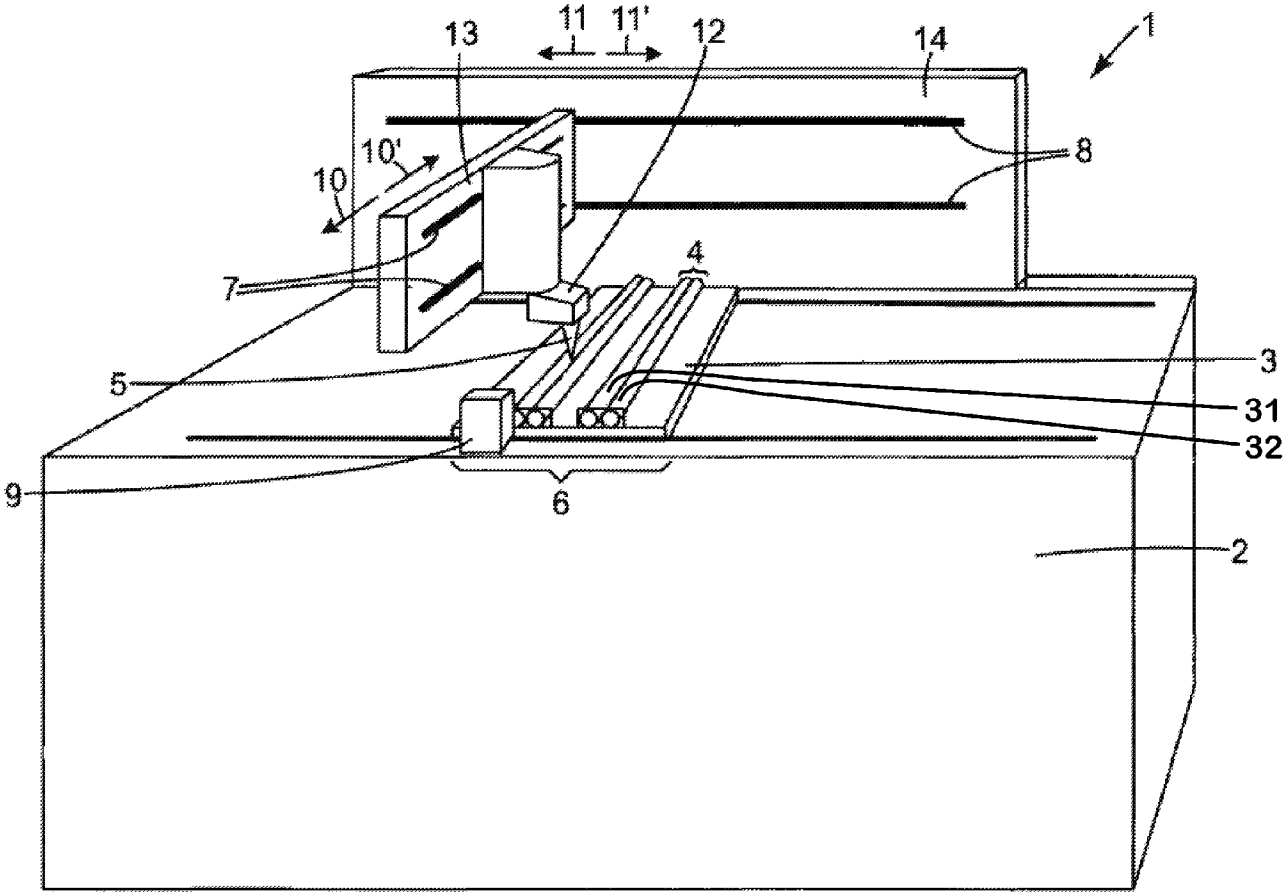
FIG. 1 is an illustration of one embodiment of the coating apparatus.

One aspect of the present invention relates to an apparatus for coating a rollable device, the apparatus including a pair of rollers and a spray nozzle. The pair of rollers, which include a first roller and second roller are rotatable and are arranged substantially parallel to each other and are separated by a gap. The pair of rollers can support and rotate one or more rollable devices to be coated. A rollable device is typically positioned on the rollers between the tip of the spray nozzle and the gap between the rollers. Since the rollable device is positioned over the gap, the gap is generally not larger than the diameter of the rollable device. "Rollable device" or "device" refers to any sort of object that can receive a spray coating and that can be held in position by the pair of rollers and rotated in place. Rollable devices can have a cylindrical or tubular shape and can be rotated about the axis of the pair of rollers.

The spray nozzle is configured to produce a spray of a coating material that is directed towards the gap between the rollers. When the spray nozzle is actuated and when the device is positioned on the rollers, at least a portion of the device is coated with the coating material. In one aspect of the invention, the coating nozzle is configured to produce a spray having a narrow spray pattern. As used herein, "spray pattern" refers to the shape of the body of coating material sprayed from the spray nozzle, wherein the shape of the spray pattern is independent of the presence of the rollers. "Spray" or "sprayed material" refers to the droplets of coating material that are produced from the spray nozzle.

In one embodiment of the invention, a majority of the sprayed coating material is passed through the gap, the amount of passed material being measured when the device is not positioned on the pair of rollers. In another embodiment, the spray nozzle is configured to produce a spray of coating material having a spray pattern wherein the width of the spray pattern at the gap that is not greater than 150% of the width of the gap. According to these embodiments, a device positioned on the rollers can receive a portion of the sprayed coating material, be rotated, and receive subsequent applications of the coating material as needed. The majority of the coating material that is not deposited on the device generally passes through the gap. A smaller amount of a coating material may get deposited on the rollers although this smaller amount does not adversely affect the coating process or coated device. For example, when a device having perforations or openings is coated, some coating material will pass through the device. A majority of the sprayed coating material that passes through the device will also pass through the gap between the rollers.

In one embodiment, the spray nozzle is angled relative to the first axis or second axis. That is, the spray nozzle is tilted so that the sprayed material is delivered at an angle relative to the axis of the rollers. The angle is less than 90° but more than 5° relative to the axis of the rollers. This arrangement is particularly useful when coating devices that have openings, as a greater amount of the sprayed coating material can be deposited on the surface of the device rather than being passed through the device and through the gap.

For some devices, such as devices having a cylindrical or tubular shape, a coating process typically involves applying the coating material multiple times (i.e., multiple applications of a coating material) on the device, wherein each time a different portion of the device receives an application of the coating material. Often, the same or overlapping portions of the device are coated multiple times in order to produce a device having a desired quality or quantity of coating material. Generally, after a portion of the device is coated with a first application of a coating material, the rollers are rotated, for example, by an indexing function, thereby rotating the device to a position for a subsequent application of a coating material.

The device can be coated and rotated until a desired coating is achieved. The apparatus is particularly suitable for coating rollable devices having complex surface geometries, for example, medical devices such as stents having multiple sections, or other rollable devices that include webbed-like structures, or that have spaces, apertures, openings, or voids.

In one aspect, the apparatus and the methods described herein allow for a "wet coating" method. Wet coating involves disposing the coating material on a portion of the device and then rotating the device on the rollers, placing the coated portion of the device in contact with the rollers prior to the coating material drying on the coated portion of the device. "Dry" or "dried" refers to the condition of the coated portion of the devices, wherein the coated portion is not tacky and wherein most of any solvent in the coated portion has evaporated from the device surface. The current apparatus and methods described herein provide a significant improvement in spray coating, as previous coating processes typically require that the coating is dried before the device is manipulated.

In one embodiment of the invention, the spray nozzle is movable. More specifically, the spray nozzle is movable in a direction parallel to the axis of the first or second roller. The nozzle can be moved along the axis while applying a coating to one or more devices that are positioned on the pair of rollers, thereby resulting in a portion of one or more devices being coated. For example, the spray nozzle can provide a coating material to a portion of a device having a cylindrical shape while moving along the roller axis allowing for a "stripe" of coating material to be deposited along a portion of the length of the device. The stripe of deposited coating material has a width that is typically a fraction of the circumference of the device. The device can be rotated as desired and the step of depositing coating material can be repeated. According to the arrangement of the nozzle having a spray pattern and the pair of rollers having the gap, the majority of the coating material that does not get deposited on the device is passed through the gap between the rollers. This avoids excess accumulation of coating material on the rollers that could compromise the quality of the coating process.

These arrangements allow for the improved spray coating of a rollable device, particularly when the device is positioned, coated, and rotated with the spray coating apparatus as described herein. These improvements can been seen, for example, in the uniformity of the applied coating, the consistency in the amount of applied coating, and the rate that the coating material can be applied to a device. A substantial improvement in coating is observed as compared to traditional coating apparatus or other spray coating arrangements.

In order to describe the invention in greater detail, reference to the following illustrations are made. The illustrations are not intended to limit the scope of the invention in any way but are to demonstrate some of the various embodiments of the coating apparatus and its features. Elements in common among the embodiments shown in the figures are numbered identically and such elements need not be separately discussed.

In one embodiment, the coating apparatus includes a device rotator having at least one pair of rollers which include a first roller and second roller, a gap between the first and second rollers, and a spray nozzle producing a spray pattern directed at the gap. As illustrated in FIG. 1, the coating apparatus 1 according to the invention can include a housing 2 on which the coating process is performed. A tray 3 having one or more pairs of rollers 4 can be positioned on the top of the housing 2. Tray 3 can be brought into the proximity of a spray nozzle 5. Now referring to FIG. 3, which illustrates the tray 3 in greater detail, the pair of rollers 4 includes a first roller 31 and a second roller 32 (also referred to as "roller" or "rollers") which are arranged substantially parallel to each other and mounted on tray 3 by bracket 33. Now referring to FIG. 7, which also shows the pair of rollers 4 in greater detail, gap 70 separates the first roller 31 and the second roller 32.

Gap 70 is maintained at a constant width along the entire length of the pair of rollers. Gap 70 also has a width that is less than the size of the device (i.e., typically the diameter of a device having a cylindrical shape) to be coated. In most arrangements gap 70 is less than 5 cm. In some preferred embodiments gap 70 is less than 10 mm wide and, more preferably, less than 2.5 mm wide. In one particularly preferred embodiment, the gap is in a range of 0.1 mm to 2.5 mm wide.

Figure 2:
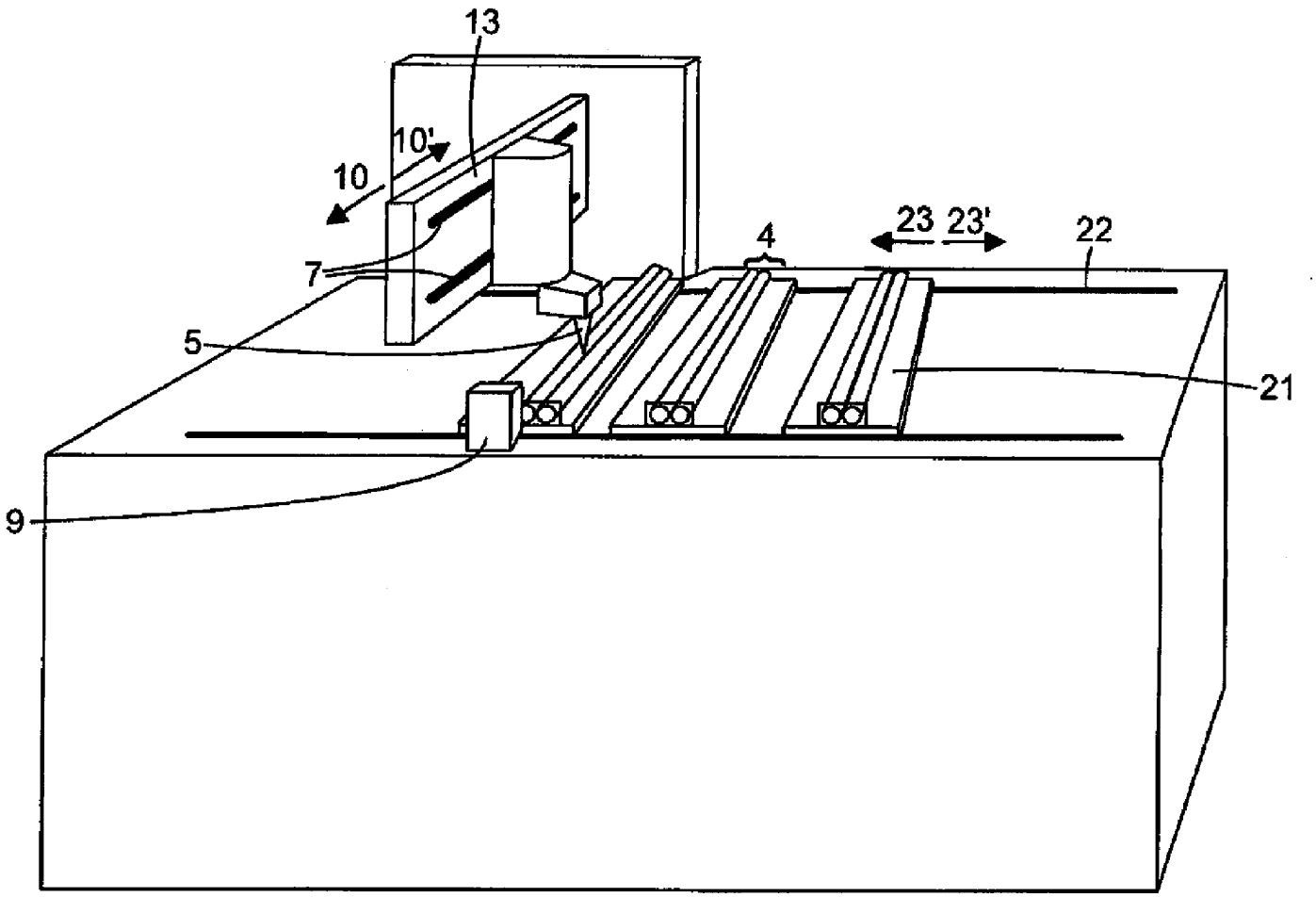
FIG. 2 is an illustration of another embodiment of the coating apparatus.

Referring back to FIG. 3, first roller 31, second roller 32, or both, are rotatable in either direction as indicated by arrows 34 or 34'. Typically, the first roller 31 and the second roller 32 are rotatable in the same direction. Bracket 33 can also include a fastening mechanism, such as a screw, pin, or clamp, which keeps the bracket 33 together and secures the first roller 31 and second roller 32 to the tray 3. The fastening mechanism of the bracket 33 can be loosened to uncouple the bracket 33 and allow removal and replacement of the rollers. Tray 3 can include any number of pairs of rollers 4. For example, the tray could include two pair of rollers as illustrated in FIG. 1 or one pair of rollers as illustrated in FIG. 2.

The rollers can be of any length or circumference, but preferably have a length in the range of 1 cm-1000 cm and more preferably in the range of 5 cm-100 cm. The rollers preferably have a circumference is in the range of 1 mm-100 cm, and more preferably in the range of 5 mm-100 mm. Rollers can be fabricated according to the size and the desired number of the devices to be coated during the coating process. The diameter of the rollers can either be larger or smaller from the diameter of the device to be coated.

The rollers can be made of any suitable durable material, for example, stainless steel, polypropylene, high density polyethylene, low density polyethylene, or glass. Optionally the rollers can be coated with non-stick materials, including, but not limited to, compounds such as tetrafluoroethylene (TFE); polytetrafluoroethylene (PTFE); fluorinated ethylene propylene (FEP); perfluoroalkoxy (PFA); fluorosilicone; and other compositions such as silicone rubber.

Figure 4:
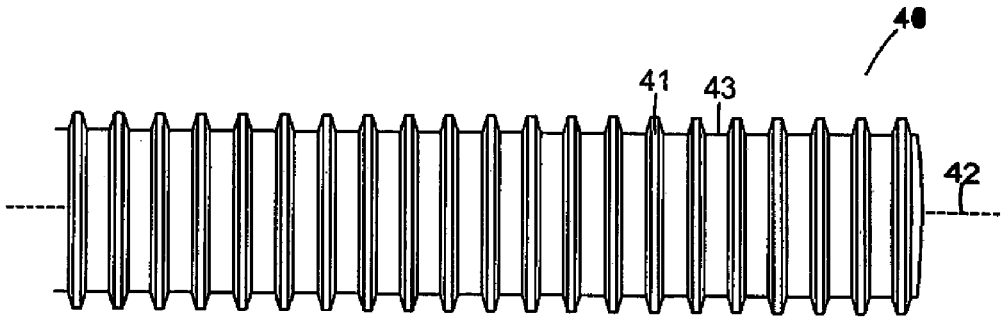
FIG. 4 is an illustration of a roller having rib structures.

In another embodiment, the coating apparatus includes a device rotator having at least one pair of rollers, and either, or both, the first and second roller includes at least one rib-like structure, herein referred to as "ribs". Ribs refer to any sort of raised portion around the circumference of the roller. As illustrated in FIG. 4, roller 40 is shown having plurality of ribs 41. The ribs 41 of the roller 40 are typically spaced along the length of the roller 40 and can be an integral part of the roller itself. For example, and in a preferred embodiment, the ribs 41 are molded around the central portion of the roller. Alternatively, the ribs 41 can be formed by placement of O-rings or bands around a rod, such as a metal rod, which is the central portion of the roller. Generally, the ribs 41 are arranged perpendicular to the central axis 42 of the roller 40 and are spaced by a non-ribbed surface 43 of the roller 40. The ribs 41 can be spaced in any manner, for example, evenly, or unevenly.

Figure 5:
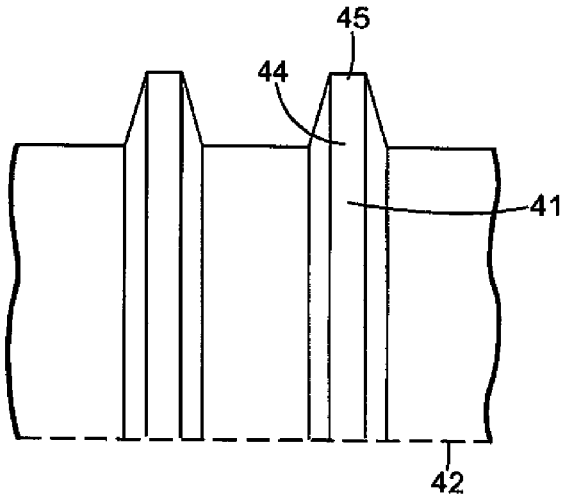
FIG. 5 is an illustration of the rib portion of a roller having rib structures.

In a preferred embodiment, referring to FIG. 5, the ribs 41 of the roller have a wider portion 44 proximal to the central axis 42 of the roller 40, and a narrower portion 45 distal to the central axis 42 of the roller. The gradual narrowing of the rib 41 further from the central axis can be exemplified in a variety of shapes. For example, rib 41 can have a triangular shape or tapered shape. Other rib shapes, for example, trapezoidal shapes or shapes that include curved surfaces and that provide a shape that is wider proximal to the central axis 42 of the roller 40 and narrower distal to the central axis 42 of the roller are also contemplated.

In one aspect of the invention, the narrower portion 45 of the ribs 41 can be in contact with the device when the device is positioned on the pair of rollers. Generally, the narrower portion 45 of the rib 41 provides minimal surface contact with a device yet allows the device to be rotated by rotation of either the first or second roller. The ribs 41 can be spaced along the roller 40 in any manner but typically are arranged to provide at least three device contact points for each pair of rollers. For example, two ribs on each roller, or, where the ribs on adjacent rollers are offset from each other, two ribs of the first roller and one rib of the second roller contact the device. According to the invention, the ribs can be spaced in the range of 1 rib/0.1 mm to 1 rib/10 cm along the length of the roller, and more preferably in the range of 1 rib/mm to 1 rib/20 mm along the length of the roller.

Figure 6:
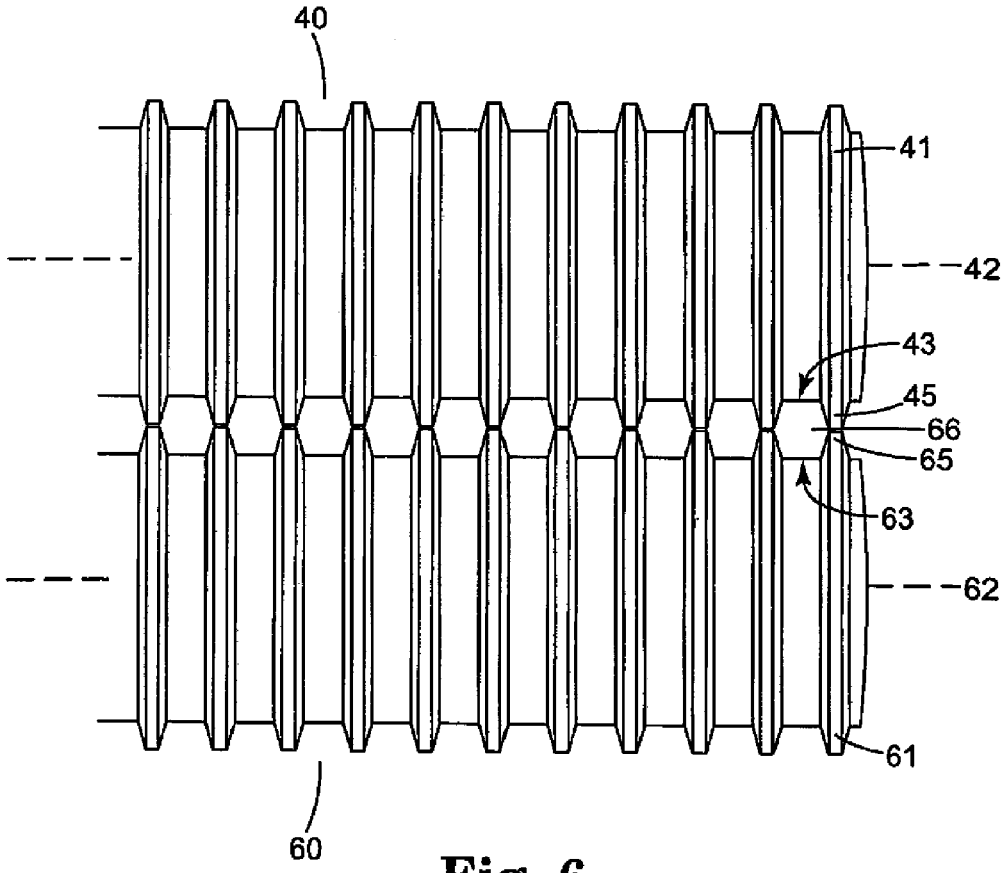
FIG. 6 is an illustration of a pair of rollers having rib structures.

In one embodiment, as illustrated in FIG. 6, a pair of rollers includes a first roller 40 having a plurality of first roller ribs 41 and a second roller 60 having a plurality of second roller ribs 61, and wherein the first roller 40 and second roller 60 are substantially parallel to each other. In one aspect, the first roller ribs 41 and the second roller ribs 61, which are generally perpendicular to the first roller axis 42 and second roller axis 62, respectively, are aligned with each other. In this aspect, the narrower portion 45 of the first roller rib 41 is adjacent to a narrower portion 65 of the second roller rib 61. The distance between the narrower portion 45 and the narrower portion 65 can be small, but spaced to allow the first roller 40 and the second roller 60 to rotate freely. In this embodiment, a gap 66 exists between the first roller 40 and second roller 60, primarily between non-ribbed surface 43 of roller 40 and non-ribbed surface 63 of roller 60. Accordingly, the area of gap 66 is sufficient to allow the majority of the sprayed coating material (not shown), which is generally directed between the first roller 40 and second roller 60, to pass through the gap 66, which includes any space between the narrower portion 45 and the narrower portion 65.

In other embodiments, alignment of the first roller ribs 41 and the second roller ribs 61 is offset. In these embodiments a distance between the first roller 40 and the second roller 60 is maintained to allow for a gap of sufficient size to allow the majority of the sprayed coating material to pass through the gap.

It is understood that the gap between a first roller having a plurality of ribs and a second roller having a plurality of ribs can be of any shape or area sufficient to provide and arrangement wherein the majority of the sprayed coating material passes through the gap.

Figure 7:
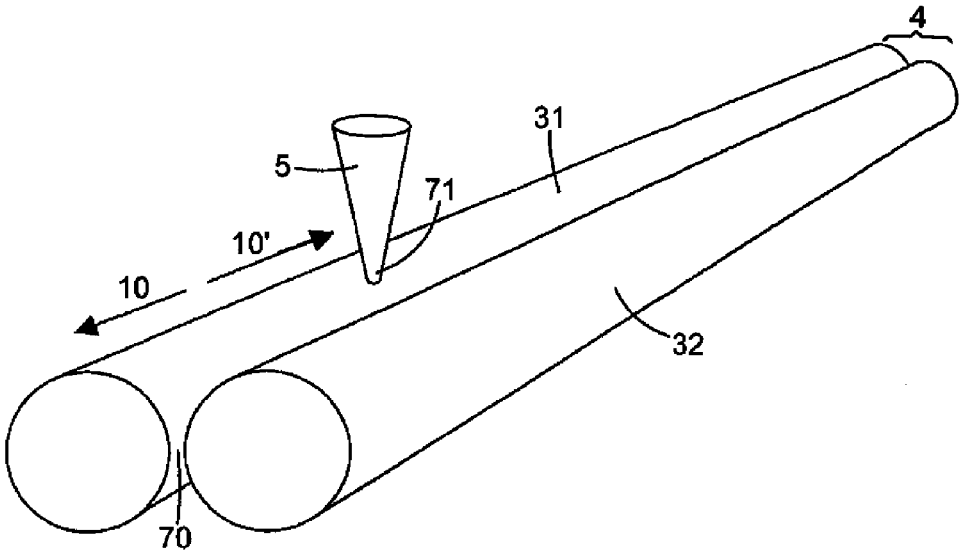
FIG. 7 is an illustration of a pair of rollers and a portion of a spray nozzle.

In one embodiment, as illustrated in FIG. 7, the first roller 31 and second roller 32 have a circular shape. However, the rollers can be of any suitable shape that allows rotation of the device on the rollers. For example, the circumference of the rollers can have flat surfaces and can be, for example, polygonal in shape. If the rollers have a polygonal shape it is preferable that there are a sufficient number of sides to cause rotation of the device on the rollers.

According to the invention, and referring to FIG. 7, prior to an application of a spray coating on the device, gap 70, between the first roller 31 and the second roller 32 is aligned with the tip 71 of the spray nozzle 5. Now referring to FIG. 9, which shows a different view of the nozzle and rollers, the tip 71 of the spray nozzle 5 is aligned with the gap 70. Alignment refers to positioning the spray nozzle 5 to that the spray of coating material 90 is directed towards the gap 70. As shown, the alignment allows the majority of the spray of coating material 90 to pass through gap 70. The spray of coating material 90 is generally directed at the gap 70, however, to a limited extent, the spray of coating material 90 can also come into contact with a portion of the first roller 31 and second roller 32.

The distance from the tip 71 of the spray nozzle 5 to the gap 70 can be arranged according to the size of the device to be coated. In one embodiment the distance from the tip 71 of the spray nozzle 5 to the gap 70 is in the range of 1 mm-15 mm. More preferably, distance from the tip 71 of the spray nozzle 5 to the gap 70 is in the range of 1 mm-7.5 mm.

Figure 9:
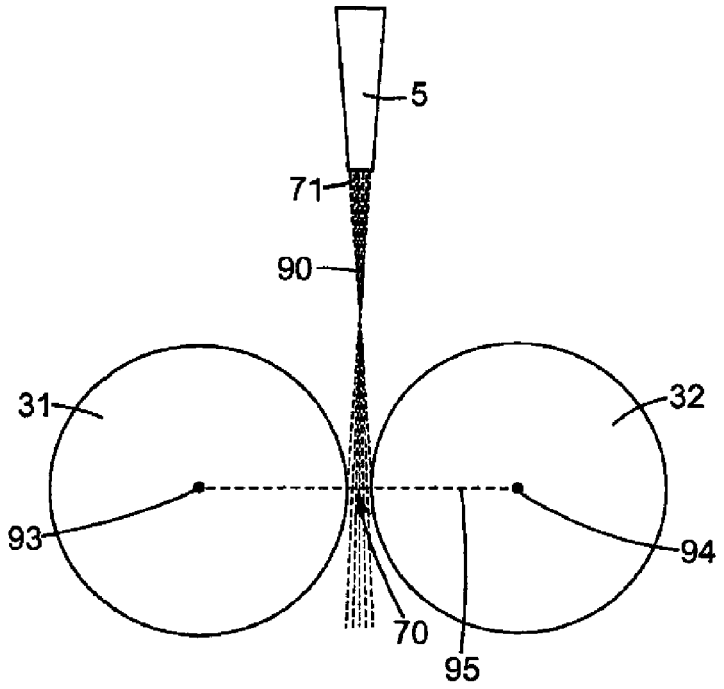
FIG. 9 is an illustration of one embodiment of the spray nozzle having a spray pattern and a pair of rollers.

Various configurations of the spray nozzle and the first and second rollers are contemplated. In one embodiment, as illustrated in FIG. 9, the first roller 31 and second roller 32 have the same circumference, are horizontally level (i.e., line 95 connecting a point on the first axis 93 and a point on the second axis 94 is parallel to the horizon), and is separated by a gap 70. In this embodiment the sprayed coating material 90 is directed from the tip 71 of the nozzle 5 towards the gap 70 and is generally perpendicular to line 95. The majority of the sprayed coating material 90 passes through gap 70 (as shown without device on the rollers).

Figure 13:
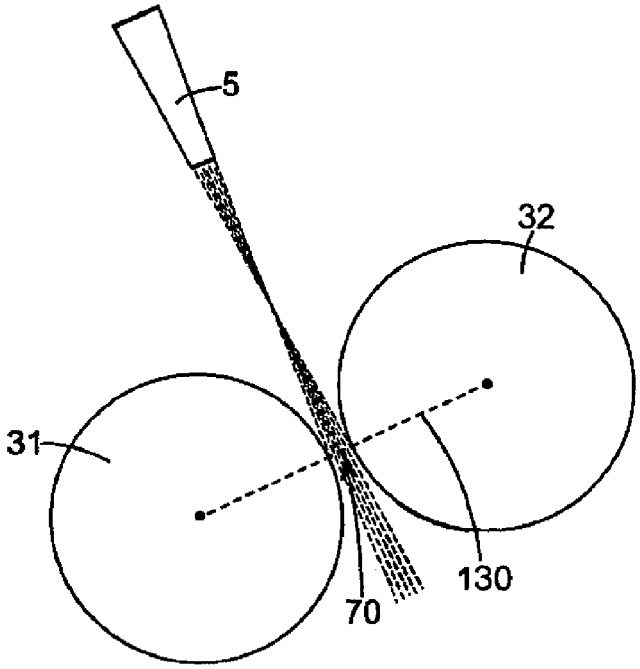
FIG. 13 is an illustration of another embodiment of a spray nozzle having a spray pattern and a pair of rollers.

In another embodiment of the invention, as illustrated in FIG. 13, the first roller 31 and the second roller 32 have the same circumference and are separated by a gap 70 but are not horizontally level with each other. Line 130 is not parallel with the horizon but is at an angle generally less than 90° relative to the horizon. Nozzle 5 is arranged to provide a spray pattern 90 that is directed towards the gap and generally perpendicular to the line 130.

Figure 14:
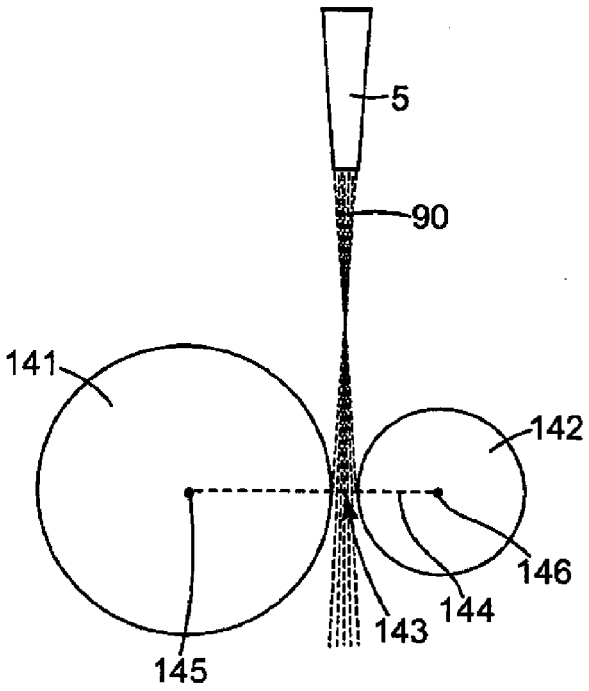
FIG. 14 is an illustration of another embodiment of a spray nozzle having a spray pattern and a pair of rollers.

In another embodiment of the invention, as illustrated in FIG. 14, the first 141 and second 142 rollers have a different circumference, are separated by a gap 143, and are horizontally level (i.e., according to line 144, established by first axis point 145 and second axis point 146). In this embodiment the sprayed coating material 90 from nozzle 5 is directed towards the gap 70 and is generally perpendicular to line 144.

Figure 10:
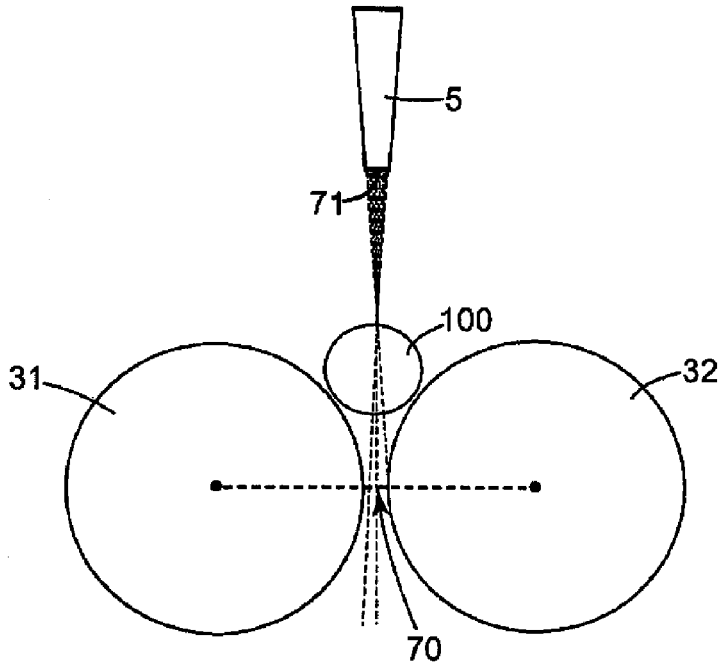
FIG. 10 is an illustration of one embodiment of the spray nozzle having a spray pattern, a pair of rollers, and with a rollable device.
Figure 11:
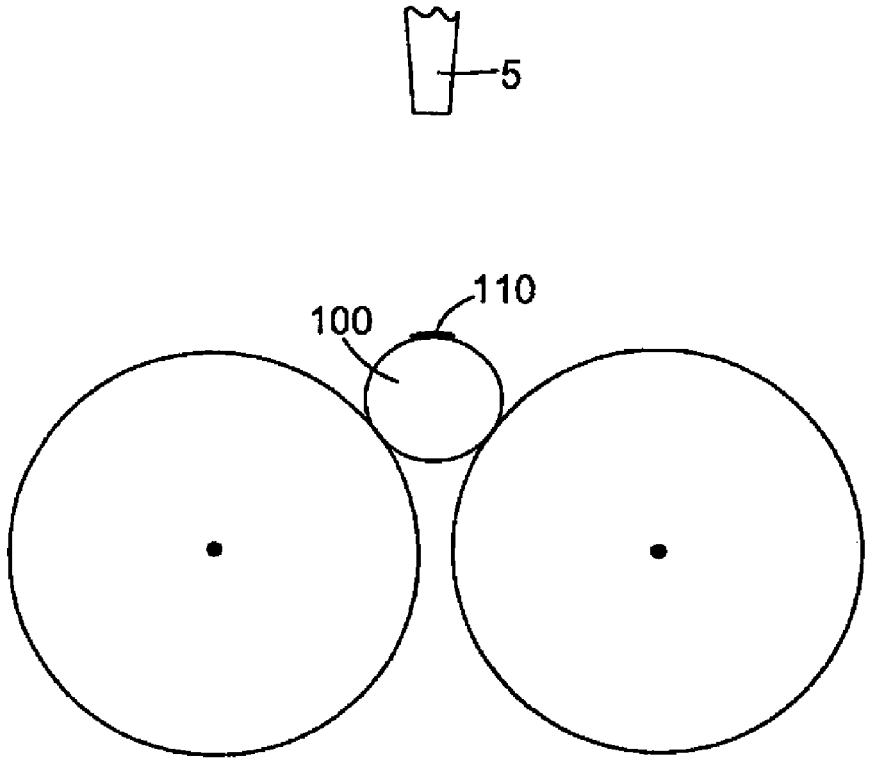
FIG. 11 is an illustration of a portion of a rollable device that has been coated with a coating solution.

During use of the coating apparatus, referring to FIG. 10, device 100 is positioned on the pair of rollers, contacting the first roller 31 and second roller 32. The device 100 is situated between the tip 71 of the spray nozzle 5 and gap 70. A portion of the device, proximal to the tip 71, receives at least a portion of the sprayed coating material 90. Generally, now referring to FIG. 11, a portion of the device 100 will have a stripe 110 of coating material applied after a first coating application.

Often, referring back to FIG. 10, device 100 will not have a contiguous surface (i.e., will have perforations or a webbed structure). During the step of providing a coating to the device 100, some of the sprayed material passes through openings in the device 100. The majority of the spray that passes through the device 100 (i.e., that does not adhere to the device), also passes through gap 70 between the first roller 31 and the second roller 32.

As previously stated, the spray pattern refers to the general shape of the body of sprayed material absent the rollers. In order to describe aspects of the invention, the spray pattern, for example, the spray pattern 90 as illustrated in FIG. 9, has a width at line 95 (the location of gap 70) that is wider than gap 70. In one embodiment of the invention, the width of the spray pattern at the gap is not greater than 150% of the width of the gap. In other arrangements, the width of the spray pattern is narrower and is not greater than 125% of the width of the gap. The width of the spray pattern at the gap can be determined by, for example, a) determining the distance from the tip 71 of the nozzle 5 to the line 95, b) removing both the first roller 31 and second roller 32, c) providing a spray of coating material to a flat surface, such as a piece of paper on a platform, for collection of the sprayed coating material, the paper set the distance from the tip 71 determined in step a), d) determining the width of the applied spray on the flat surface, and then e) comparing the width of the spray on the paper as determined in step d) to the width of the gap 70.

In another embodiment of the invention, the apparatus is arranged so the majority of the spray passes through the gap. In some arrangements, at least 75% of the spray passes through the gap; in other arrangements at least 90% of the spray passes through the gap; and yet in other arrangements at least 95% of the spray passes through the gap. In order to determine if a coating apparatus meets these requirements, a similar approach to measuring can be taken. For example, a flat surface, such as a piece of paper on a platform, can be used to collect the coating material sprayed. A paper can be placed directly below the gap to collect spray that passes through the gap. The first and second roller can then be removed and another paper (for collection of the total spray) can be placed at the same distance to collect the total spray from the spray nozzle under the same spray conditions. The papers can then be weighed to determine the amount of coating and then compared. According to the invention, the amount of coating material that passes through the gap is at least 50% of the total coating material sprayed.

Figure 15:
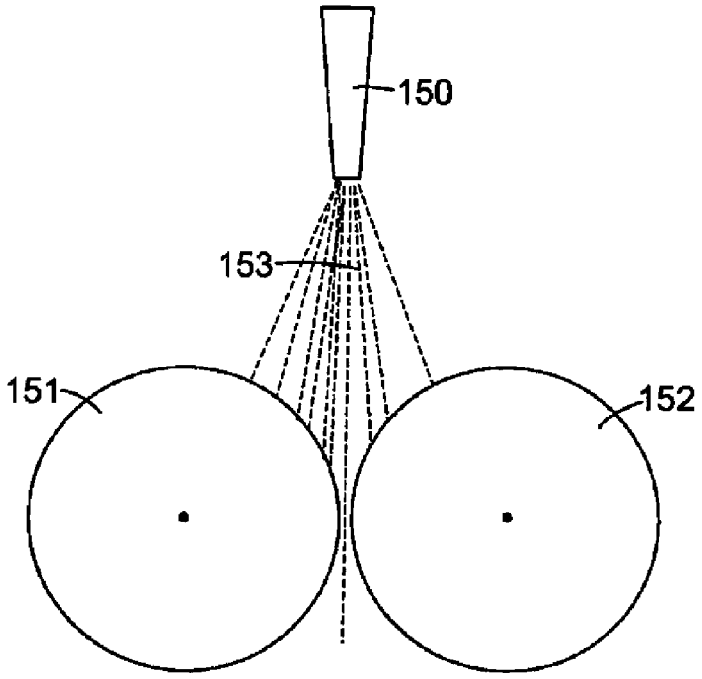
FIG. 15 is an illustration of a comparative example showing a spray nozzle having a spray pattern and a pair of rollers.
Figure 16:
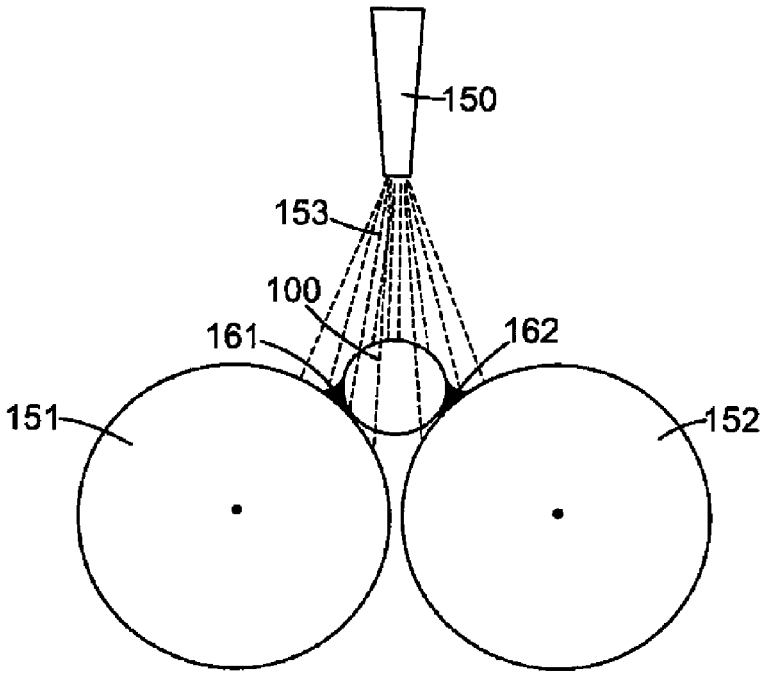
FIG. 16 is an illustration of a comparative example showing a spray nozzle having a spray pattern, a pair of rollers, and with a rollable device.

FIGS. 15 and 16 are illustrations of comparative examples. These drawings are provided to illustrate an unsuitable spray apparatus and the problems associated with using such an apparatus. As illustrated in FIG. 15, spray nozzle 150 produces spray pattern 153 wherein the majority of the spray from spray pattern 153 is deposited on the first 151 and second 152 rollers (no rollable device shown). FIG. 16 shows the presence of a rollable device on the arrangement as described in FIG. 15. As shown in FIG. 16, the spray is deposited on the first roller 151, second 152 roller, and on device 100. However, the amount of spray deposited on the rollers in this arrangement causes a pooling of sprayed material at points 161 and 162 where device 110 contacts the first roller 151 and second roller 152, respectively. The pooling of the sprayed material causes defects in the application of the coated material and can generally impede the coating process. Coating defects include uneven application of the coating material on the surface of the device and variations in the amount of material intended to be applied to the device.

Figure 12:
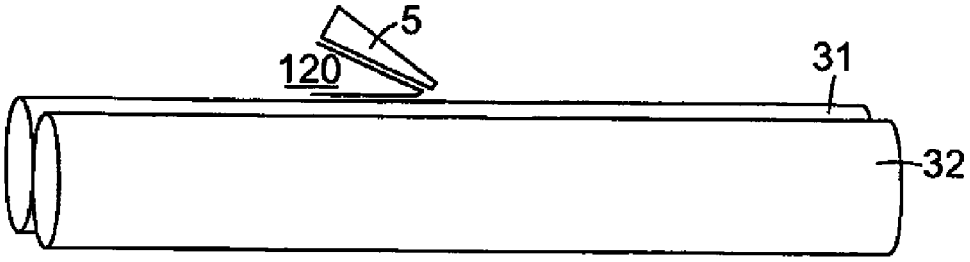
FIG. 12 is an illustration of a pair of rollers and a portion of a spray nozzle that is angled relative to the axis of the rollers.

In one preferred embodiment of the invention, the spray nozzle is angled relative to the first axis or second axis. As illustrated in FIG. 12, spray nozzle 5 is tilted so that the sprayed material is delivered at an angle 120 relative to the axis of the first roller 31 or second roller 32. Angle 120 is less than 90° but more than 5° relative to the axis of the rollers. This arrangement is particularly useful when coating devices that have openings as a greater amount of the sprayed coating material can be deposited on the surface of the device rather than passing through the device and through the gap.

Spray Nozzle According to the invention, the spray nozzle can be any sort of droplet producing system that either A) produces a spray of a coating material that is directed towards the gap between the rollers where a majority of the sprayed coating material passes through the gap, or B) that is configured to produce a spray of coating material having a spray pattern wherein the width of the spray pattern at the gap is not greater than 150% of the width of the gap. Typically, the spray nozzle is configured to produce a spray having a narrow spray pattern.

The spray nozzle of the coating apparatus can be a jet nozzle. Suitable jet nozzles, for example, jet nozzles found in ink jet printers, can be obtained from The Lee Company (Westbrook, Conn.). Various types of ink jet nozzles are contemplated, for example, thermal inkjet nozzles which utilize thermal energy to emit solution from the nozzle via a pressure wave caused by the thermal expansion of the solution; electrostatic inkjet nozzles wherein a solution is emitted from the nozzle by electrostatic force; piezoelectric inkjet nozzles in which solution is ejected by means of an oscillator such as a piezoelectric element; and combinations of these types of inkjet nozzles.

Figure 8:
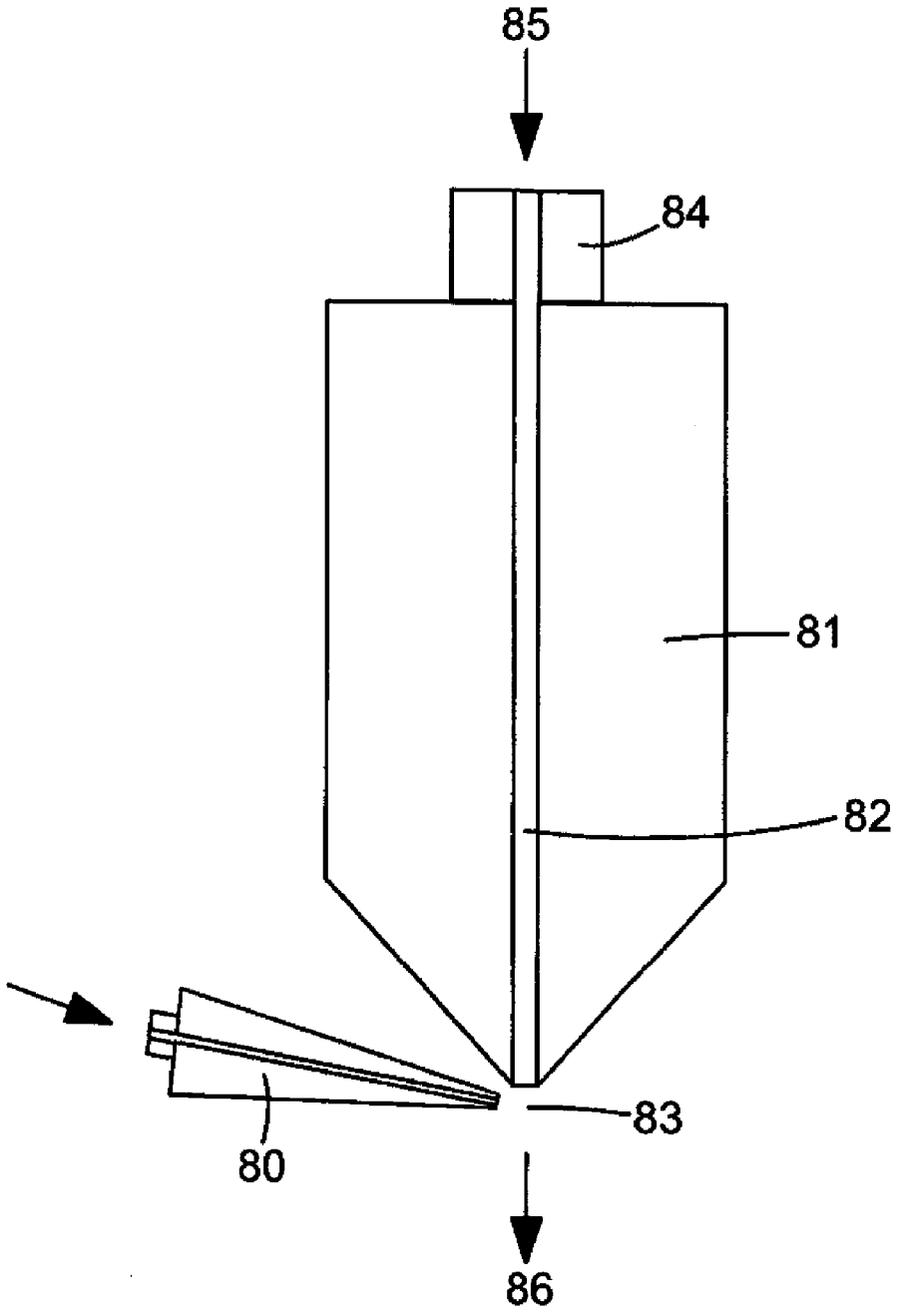
FIG. 8 is an illustration of a sonicating nozzle.

In a preferred embodiment of the invention, the spray nozzle is a sonicating nozzle. A preferred arrangement of a sonicating nozzle is illustrated in FIG. 8, the sonicating nozzle can have at least two independent members: a solution delivery member 80 and an air delivery/sonicating member 81. The air delivery/sonicating member 81 includes a channel 82 bored though the body of the air delivery/sonicating member 81. Gas 85 can be provided from a gas delivery line (not shown) to an inlet 84 on the air delivery/sonicating member 81 and can travel through the channel 82 to the tip 83 where a stream 86 of gas is generated. A coating solution is delivered through solution delivery member 80 via a solution delivery line (not shown) to the tip 83 of the nozzle, where, at this point, the solution is sonicated at the tip 83 of the air delivery/sonicating member 81, producing droplets of solution, and the droplets are drawn into and carried by the gas stream 86 originating at the tip 83 of the nozzle.

Various nozzles can produce spray patterns having different shapes. FIG. 9 illustrates a spray pattern that can be generated from a sonicating nozzle. The sonicating nozzle can produce a spray pattern 90 having a focal point at a distance from the tip 5 of the nozzle 71. The spray pattern produced by this type of ultrasonicating nozzle is considerably narrower than many other spray patterns generated from traditional types of spray nozzles. A suitable sonicating nozzle is the MicroFlux XL nozzle sold by SonoTek (Milton, N.Y.). This spray nozzle is able to provide a spray pattern having a minimal width of 0.030 inches (0.768 mm). Nozzles producing other spray patterns, such as patterns having a conical shape (not shown) and that fall within the context of the invention are also contemplated.

Delivery of the coating material in the form of a spray can be affected by various operational aspects of the sonicating nozzle. These include the rate of delivery of the solution, the size of the orifice of the solution delivery member, the distance of the solution delivery member from the tip of the sonicator/air delivery member, the tip size and configuration of the sonicator, the amount of energy provided to the sonicator, the size of the orifice at the outlet of the gas channel, the rate of delivery of gas from the gas delivery port (air pressure), and the type of gas delivered from the nozzle.

Referring back to FIG. 1, the tray 3 having one or more pairs of rollers 4 can be situated in a coating zone 6 on the top of the housing 2 of the apparatus 1. The coating zone 6 is an area on the housing 2 where the spray coating process takes place and the area in which spray nozzle 5 is movable. The spray nozzle 5 is movable via first track 7 and second track 8, which will be discussed in greater detail below.

Tray 3 can be positioned in the coating zone 6 by actuation of an alignment system (not shown). Actuation of the alignment system can allow the precise placement of the pair of rollers under the spray nozzle 5, wherein the gap 70 between the first and second rollers is precisely aligned with the tip 71 of the spray nozzle 5. The alignment system of the current invention can include, for example, insertable and retractable alignment pins (not shown) that protrude from the housing 2. The tray 3 having one or more roller pairs 4 can include positioning holes (not shown) that accept the alignment pins. The tray 3 can be moved into the coating zone either manually or automatically and the alignment system can be actuated to insert the alignment pins into the positioning holes thereby aligning the tip 71 of the spray nozzle 5 with gap 70.

In another embodiment, referring to FIG. 2, tray 21 having a pair of rollers 4 can be brought into the coating zone via track 22 which can be a part of a conveyor mechanism.

Figure 3:
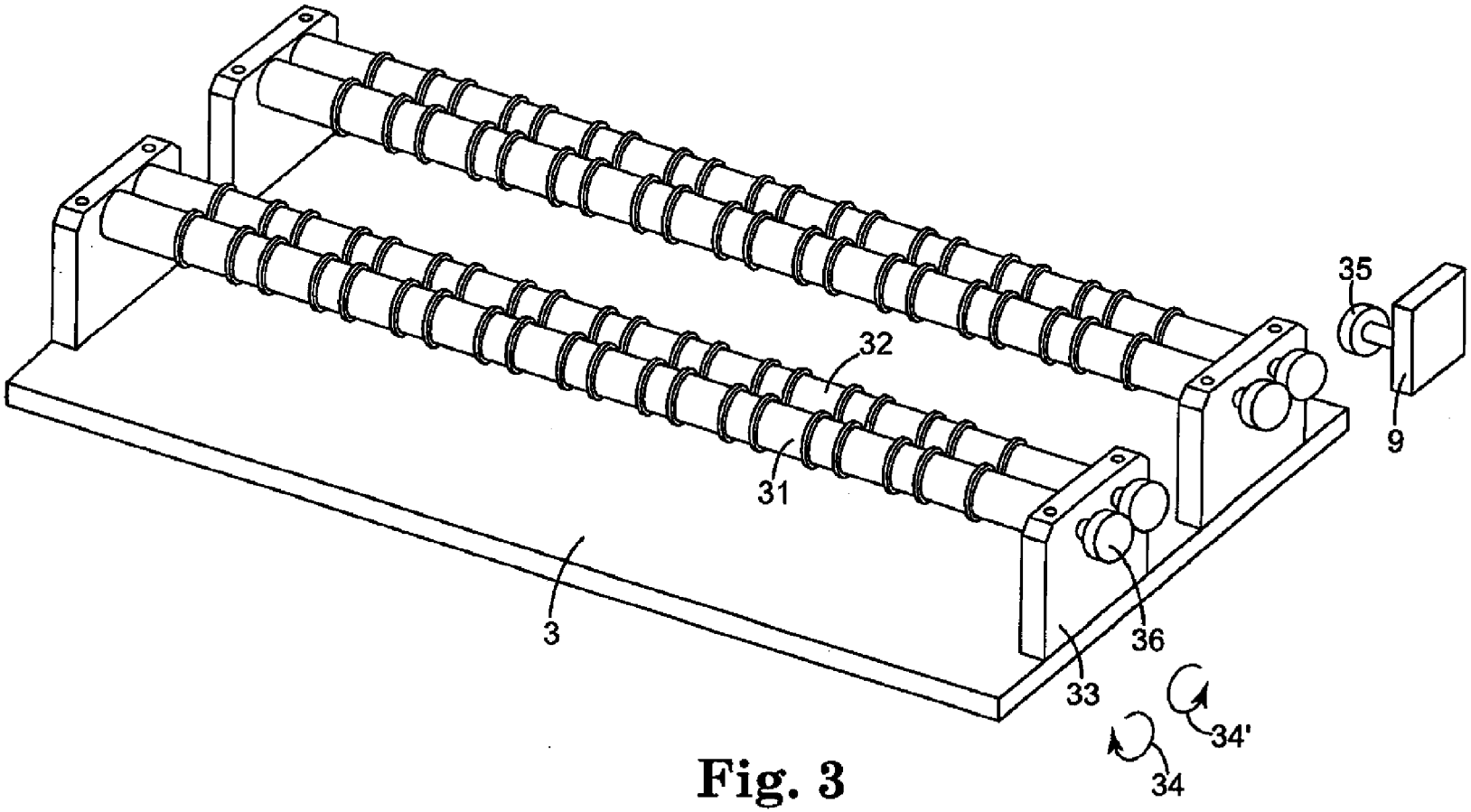
FIG. 3 is an illustration of two pairs of rollers attached to a tray.

When the pair of rollers 4 are properly situated in the coating zone, a portion of the rollers can engage a roller drive mechanism that can cause rotation of the rollers. Referring to FIG. 1, tray 3 having at least one pair of rollers 4 is positioned in a coating zone 6 and at least a portion of one pair of rollers is brought into contact with a roller drive mechanism 9. Referring to FIG. 3, either distal end of the first roller 31 or the second roller 32 is configured to engage a shaft 35 of the roller drive mechanism 9. The distal portion of the roller that engages the shaft 35 of the roller drive mechanism 9 can include a meshing/engagement member 36, such as a sprocket, gear, or a rounded member. Either or both the distal portions of the first roller 31 and the second roller 32 can include a meshing/engagement member 36. Rotation of the shaft 35 by actuating the roller drive mechanism 9 causes rotation of first roller 31, the second roller 32, or both the first and second roller. Typically, both the first roller 31 and second roller 32 are rotated by the roller drive mechanism 9 in a direction as indicated by arrow 34 or in a direction as indicated by arrow 34'.

In another embodiment, the distal portion of first roller 31, the second roller 32, or both the first and second roller can be connected to a continuous drive member (not shown) such as a belt or chain. One or both rollers from more than one pair of rollers 4 can be connected to the continuous drive member. When a tray including more than one pair of rollers 4, each pair of rollers connected to a continuous drive member, is positioned in the coating area, the shaft 35 of the roller drive mechanism 9 can engage the meshing/engagement member 36 of the roller and cause rotation of all of the rollers on the tray via the continuous drive member.

The roller drive mechanism 9 can also have an indexing function which allows for intermittent rotation of the shaft 36 which translates to intermittent rotation of the rollers. The indexing function of the roller drive mechanism 9 can allow rotation of the rollers in a manner sufficient to rotate devices that are situated on the rollers. The indexing function of the roller drive mechanism 9 will be described in greater detail below.

According to the invention, the coating apparatus can include a spray nozzle 5 that is movable in a direction that is parallel to the central axis of the roller or is both parallel and perpendicular to the central axis of the roller.

In one embodiment, referring to FIG. 1, the spray nozzle 5 can be moved in directions according to arrows 10 and 10', which is parallel to the central axis of the rollers 4, and arrows 11 and 11', which is perpendicular to the central axis of the rollers 4. As illustrated in FIG. 1, spray nozzle 5 is attached to nozzle mount 12 which is attached to and movable in directions 10 and 10' on first track 7 of movable arm 13. Movable arm 13 is attached to second track 8 which is included in panel 14 and movable in directions 11 and 11'. Nozzle mount 12 can be moved on the first track 7 by the operation of a first track drive (not shown). A first track motor (not shown) can drive the movement of the first track drive, which can be a belt, chain, pulley, cord, or gear arrangement; operation of the first track motor allows the nozzle mount 12 to travel in directions 10 and 10'. Movable arm 13 is connected to second track 8 and movable in directions 11 and 11'.

In another embodiment, as illustrated in FIG. 2, the spray nozzle 5 is movable in either direction according to arrows 10 and 10' and at least one pair of rollers 4 are movable in directions 23 and 23' either manually or automatically. One pair of rollers is typically attached to a single tray 21. The spray nozzle can travel in either direction 10 or 10' during the process of disposing a coating material on a substrate. After spray nozzle 5 has completed a coating process, the tray 21 can be moved from the coating zone and another tray can enter the coating zone.

Method of Coating a Rollable Device

The coating apparatus and methods described herein provide numerous advantages for coating rollable devices. In particular, the apparatus is very suitable for coating small objects, such as small medical devices having a cylindrical or tubular shape.

Generally, the method of using the coating apparatus includes coating a rollable device by first placing a rollable device on a device rotator which includes a pair of rollers having a gap. The rollable device is generally supported by the pair of rollers and is positioned between the gap and a tip of a spray nozzle. In one embodiment, both the width of the gap and the width of the spray pattern are less than the size of the device (i.e., the diameter of the device). A coating material is then disposed from a spray nozzle and at least a portion of the coating material becomes deposited on the device. Typically, the portion of the device that is most proximal to the tip of the spray nozzle receives a coating. The coating material that is applied to the device is produced from the spray nozzle in a spray pattern that is directed at the gap. The majority of any spray that does not get deposited on the device passes through the gap. For example, devices such as stents typically have openings in their structure that can allow the sprayed coating material to pass through. After the coating material is applied to the device, the device can be rotated according to the movement of the first or second roller and the step of disposing a coating material can be repeated a desired number of times.

According to the invention, any device that is suitable for receiving a coating material and being rotated utilizing the apparatus described herein can be used as a device in the coating process. Generally, the device has shape that can allow the device rotator to rotate the device during the coating process. The device can have, for example, a circular shape or a polygonal shape.

The coating apparatus is particularly useful for coating devices having a tubular or cylindrical shape such as catheters and stents. In one embodiment the method includes coating reliable devices that have holes in their structure, such a stents, or other rollable devices that include webbed-like structures, or that have spaces, apertures, openings, or voids. These devices can be coated but typically allow the passage of a sprayed material through the device. The coating apparatus is particularly suitable for coating rollable devices having a diameter of 5 cm or less and more particularly for devices having a diameter that is 10 mm or less.

Medical devices which are permanently implanted in the body for long-term use (i.e., long term devices) or used temporarily (i.e., short term devices) in the body are contemplated. Long-term devices include, but are not limited to, grafts, stents, stent/graft combinations, valves, heart assist rollable devices, shunts, and anastomoses devices; catheters, such as central venous access catheters; and orthopedic devices, such as joint implants. Short-term devices include, but are not limited to, vascular devices such as distal protection devices; catheters such as acute and chronic hemodialysis catheters, cooling/heating catheters, and percutaneous transluminal coronary angioplasty (PTCA) catheters; and glaucoma drain shunts.

In order to apply a coating material to the rollable device, the rollable device is first placed on the pair of rollers 4, making contact with the first roller 31 and second roller 32. The device can be placed on the rollers manually, or, in some embodiments, can be placed on the rollers automatically, for example, using a robotics system. Typically, multiple devices are placed on the pair of rollers 4 along the length of the rollers. The number of devices placed on the pair of rollers 4 may depend on the size of the device and the length of the pair of rollers 4.

In another embodiment, a plurality of devices can be placed on multiple pairs of rollers, the multiple pairs of rollers attached to a single tray (for example, referring to the tray of FIG. 3). A tray having more than one pair of rollers can accommodate a plurality of devices.

In some embodiments, the devices are placed along a pair of rollers, the rollers having a plurality of ribs 41 (for example, referring to the roller in FIG. 4). An individual device is typically contacted by at least three ribs 41 from a pair of rollers having ribs to ensure rotation of the device when the rollers are rotated.

Prior to the spraying of a coating material from the spray nozzle 5, devices placed on a pair of rollers 4 are brought into a coating zone. The coating zone is an area on the housing 2 generally where the spray coating process takes place and is generally the area in which spray nozzle 5 is movable.

In one embodiment and referring to FIG. 1, the coating zone includes the area in which tray 3 is located. Spray nozzle 5 is movable to any position over tray 3. More specifically, spray nozzle 5 is movable along the central axis of the pair of rollers 4 in directions 10 and 10' and also in a direction perpendicular to the plane of the first and second axis, in directions 11 and 11'. Tray 3, having multiple pairs of rollers 4, can be brought into the coating zone 6 and aligned via an alignment system. Tray 3 can be moved into the coating zone manually or automatically and the alignment system can be actuated to insert alignment pins into the positioning holes, *and with reference to FIG. 7,* thereby aligning the tip [51] *71* of spray nozzle 5 with the gap [71] *70* between the first roller 31 and the second roller 32.

When the tray is positioned in the coating zone it can also be brought into contact with roller drive mechanism 9. Shaft 35 of the roller drive mechanism 9 can engage the distal portion of one roller of the roller pair 4 via a meshing/engagement member 36. Rotation of the shaft 35 by actuating the roller drive mechanism 9 causes rotation of first roller 31, the second roller 32, or both the first and second roller. The distal portion of first roller 31, the second roller 32, or both the first and second roller can also be connected to a continuous drive member (not shown) such as a belt or chain. One or both rollers from more than one pair of rollers can be connected to the continuous drive member. When the tray 3 including at least one pair of rollers 4 is positioned in the coating area, the shaft 35 of the roller drive mechanism 9 can engage the continuous drive member. Actuation of the roller drive mechanism 9 can cause rotation of the one or both rollers of one or more roller pairs.

During the step of disposing a coating material on the rollable device, a coating solution is dispensed from the spray nozzle and directed at the rollable device towards the gap between the first and second roller. In some coating procedures the device can be a device having few or no pores in its structure. In other coating applications the device can be a device having considerable porosity or openings in its structure. In coating devices that have considerable porosity or openings, a portion of the coating material will be directed through these openings. According to the invention, the majority of the coating material that is not deposited on the surface of the device passes through the gap. In this arrangement, significant accumulation of coating material on the rollers is avoided. This is advantageous in many regards. For example, it avoids pooling of the coating material at the points where the device contacts the first and second rollers. In addition, it reduces the amount of coating material wasted during the coating process, resulting in a more cost-effective approach to coating.

During the coating process either a portion or the entire rollable device can be coated. Typically, the entire periphery of the device, at least, is coated during the coating process. This can be achieved by repeatedly applying coating material and rotating the device between the applications of coating material. During one application generally not more than one half of the device is coated with the coating material. More typically, not more than one quarter of the device is coated and even more typically not more than one eighth of the device is coated during a coating application. Generally, about 10 applications of the coating material are generally required to completely coat the circumference of the device. When small medical devices such as stents are coated it is typical to apply at least 10 applications of the coating material to provide a useful amount of coating material to the device surface. In other processes it may be desirable only to coat a portion of the device.

In one embodiment the coating material is applied from a sonicating nozzle. Referring to FIG. 8, the sonicating nozzle can include a solution delivery member 80 and an air delivery/sonicating member 81. A suitable sonicating nozzle is the MicroFlux XL nozzle sold by SonoTek (Milton, N.Y.). In some embodiments, in the step of disposing the coating material from the sonicating nozzle, air is supplied to the nozzle in the range of 0.5-5 psi and more specifically in the range of 2-3 psi. The coating solution is supplied to the nozzle in the range of 0.1-0.4 ml/min, and the power of the sonicating tip can be in the range of 0.1-2 watts. Although the distance from the tip of the nozzle to the most preferably 2-4 mm. The width of the applied coating material can be variable although typical widths are in the range of 0.75 mm to 10 mm on the surface of the device.

Any compound that can provide a homogenous coating material can be used. A wide range of compounds and solvents can be sprayed onto the device, including compounds and agents that may improve the function of the device, for example, the function of an implantable medical device in vivo. These improvements can be manifested for example, in increased biocompatibility or lubricity of the coated device. Such compounds or agents can include biologically active agents, such as pharmaceuticals, or other compounds such as polymers, for example, hydrophilic or hydrophobic polymers. Typically, these compounds or agents can be suspended or dissolved in a solvent and then deposited on the device via the spray nozzle. A wide variety of solvents can be used, ranging from polar to nonpolar solvents. Commonly used solvents include, but are not limited to, water, THF, toluene, and alcohols. The compound or compounds can be present at any concentration sufficient to produce a spray from the nozzle.

The coating material can include synthetic or natural polymers. Useful synthetic polymers include, but are not limited to, for example, polyacrylamide, polymethacrylamide, polyvinylpyrrolidone, polyacrylic acid, polyethylene glycol, polyvinyl alcohol, and poly(HEMA), copolymers thereof, or combination thereof. Useful natural polymers include, but are not limited to, for example, polysaccharides such as polydextrans, glycosaminoglycans such as hyaluronic acid, and polypeptides or soluble proteins such as albumin and avidin, and combinations thereof. Combinations of natural and synthetic polymers can also be used. The synthetic and natural polymers and copolymers as described can also be derivatized with a reactive group, for example, a thermally reactive group or a photoreactive group.

Photoactivatable aryl ketones are preferred, such as acetophenone, benzophenone, anthraquinone, anthrone, and anthrone-like heterocycles (i.e., heterocyclic analogs of anthrone such as those having N, O, or S in the 10-position), or their substituted (e.g., ring substituted) derivatives. Examples of preferred aryl ketones include heterocyclic derivatives of anthrone, including acridone, xanthone, and thioxanthone, and their ring substituted derivatives. Particularly preferred are thioxanthone, and its derivatives, having excitation energies greater than about 360 nm.

The coating material can also contain one or more biologically active agents. An amount of biologically active agent can he applied to the device to provide a therapeutically effective amount of the agent to a patient receiving the coated device. Particularly useful agents include those that affect cardiovascular function or that can be used to treat cardiovascular-related disorders. For example, useful agents include anti-coagulants such as heparin and warfarin; thrombolytic compounds such as Streptokinase Urokinase, and Tissue plasminogen activators; and antiplatelet drugs such as aspirin dipyridamole, clopidogrel, fradafiban, and lefradafiban.

Other biologically useful compounds that can also be included in the coating material include, but are not limited to, hormones, β-Blockers, anti-anginal agents, cardiac inotropic agents, corticosteroids, analgesics, anti-inflammatory agents, anti-arrhythmic agents, immunosuppressants, antibacterial agents, anti-hypertensive agents, anti-malarials, anti-neoplastic agents, anti-protozoal agents, anti-thyroid agents, sedatives, hypnotics and neuroleptics, diuretics, anti-parkinsonian agents, gastro-intestinal agents, anti-viral agents, anti-diabetics, anti-epileptics, anti-fungal agents, histamine H-receptor antagonists, lipid regulating agents, muscle relaxants, nutritional agents such as vitamins and minerals, stimulants, nucleic acids, polypeptides, and vaccines.

The step of disposing a coating material on the device can be performed at any temperature suitable for producing a spray according to the compounds and solvents used. The coating temperature can also be adjusted to promote or prevent, for example, drying of the coating material on the device. In some embodiments coating of the device is performed in a regulated atmosphere, for example, in an atmosphere having a reduced water vapor content (i.e., reduced humidity).

While the coating is disposed from the nozzle onto the rollable device, the spray nozzle can be simultaneously moved in a direction parallel to the axis of the rollers (i.e., in direction 10 or 10'), providing a spray coating for devices that are positioned on the pair of rollers. The spray nozzle 5 can be attached to an arm 12 which is movable in a direction along the axis of the pair of rollers 4 (i.e., in direction 10 or 10') on track 7. Movement of the spray nozzle 5 along the axis while applying a coating to the device results in a "stripe" of coating material on the devices. Stripes of coating material can be applied to a plurality of devices that are positioned along the length of the pair of rollers 4. According to the invention, at least the majority of the coating material that does not get deposited on the device passes through the gap [71] *70* between the first and second rollers. Therefore the rollers do not accumulate any significant amount of coating material during the spray application.

The devices can then be rotated on the pair of rollers, for example, by using an indexing function, to position an uncoated portion of the device in line for an application of sprayed coating material. In one embodiment, the device is rotated by indexing the rollers which can proceed in a clockwise or counter clockwise pattern. In a preferred embodiment the devices are randomly indexed between applications of the coating material. For example, random indexing can proceed in both clockwise and counterclockwise directions. The devices can be indexed multiple times during a coating process, for example, between 10-200 times. Following rotation of the devices by the indexing function, another step of disposing the coating material can then be performed. The steps of applying a coating material and rotating the device can be repeated until the device is sufficiently coated, for example, until the device is coated with a certain amount of coating material.

Operation of the entire coating apparatus can be controlled automatically or portions of the coating apparatus can be controlled manually. For example, the coating apparatus can include a central computerized unit that can be programmed to perform an entire coating process. The central computerized unit can control functional aspects of the coating apparatus, for example, the dispense rate of the coating solution; the energy and air pressure supplied to the sonicating spray nozzle; the movement, rate of movement, and positioning of the spray nozzle (as driven by the track motors and track drives); the alignment of the tray on the housing; and the rotation of the rollers by the roller drive mechanism. It is understood that coating parameters can be established and programmed into the central computerized unit that allow a particular amount of coating material to be deposited on a device during a coating procedure.

According to the method of the invention, the steps of coating and rotating the device can allow for the coating process to be performed before the coating material dries on the device. Typically, in ambient conditions, the majority of drying is not achieved until 30 minutes after coating and more typically not until one hour after coating. Drying can still occur after these times, for example, up to 24 hours after application of the coating material. Traditional procedures have required that the coated device dries at least 30 minutes before it is manipulated.

However, according to the apparatus and the methods of this invention, it has been discovered that the device can be rotated, placing the coated portion of the device in contact with the rollers, prior to any significant drying of the deposited coated material. For example, the device can be coated and, within seconds, rotated, placing the coated portion of the device in contact with the rollers without compromising the integrity or quality of the coated portion. In the coating process described herein, the device is typically rotated approximately 5-15 seconds after a coating is applied to a portion of the device. However, longer or shorter times between coating the device and rotating the device are contemplated as it is not necessary that the coating material dries prior to rotation. Allowing the coating material to dry prior to contacting either the first or second roller is optional. The process of coating, rotating, and repeating the coating steps dramatically reduces the processing time standardly associated with spray coating a device such as a small medical rollable devices. In addition, there is no requirement that the devices be fixtured (i.e., held by a clamping mechanism) during the coating process, Avoiding fixturing reduces the possibility of introducing defects in the coating applied to the device. The coating method described herein produces coatings demonstrating a low degree (less than 5%) of variability in the amount of coating applied from one coated device to another coated device.

Following the steps of disposing a coating material on the device and rotating the device, the coated devices can be removed from the roller pairs and dried or can be allowed to dry on the roller pairs. Alternatively, the rollable devices can be allowed to dry on the rollers.

It is understood that changes and modifications may be made thereto without departing from the scope and the spirit of the invention as hereinafter claimed. The invention will now be demonstrated referring to the following non-limiting examples.

EXAMPLES

Example 1

Coating Apparatus

An automated coating apparatus having an ultrasonic spray nozzle (SonoTek; Milton, N.Y.) attached to a robotic arm was used to coat stainless steel stents. A coating solution was supplied to the spray nozzle using a syringe pump (kdScientific Inc., New Hope, Pa.). Stents were placed in the groove on pairs of rollers, above the gap between each roller of the pair. A total of six pairs of rollers were attached to a tray and brought into a coating zone. The spray nozzle travels over each roller, dispensing coating solution in a narrow band on the stents. When the spray nozzle reaches the end of Roller #6, Rollers #1-3 index and rotate the stents. When the spray nozzle reaches the end of Roller #3, Rollers #4-6 index. The capacity of the coating apparatus is about 50 stents, each stent 18 mm in length.

Example 2

Application of a Base Coat Material

The coating apparatus as described in Example 1 was used to provide a base coat to stents having a size of 18 mm in length by 1.5 mm in diameter. Based on the surface area of the stents, a basecoat weight range was chosen to be in the range of 600-660 μg per stent. Prior to the coating procedure, stents were individually weighed. Stents were placed on the pairs of rollers and a base coat material was deposited on the stents.

A coating solution was prepared containing pBMA (poly (butylmethacrylate)) at a concentration of 1.67 g/l, pEVA (poly(ethylene-co-vinyl acetate)) at a concentration of 1.67 g/l, and an immunosuppressive antibiotic at a concentration of 1.67 g/l, dissolved in tetrahydrofuran. The solution delivery rate from the nozzle was 0.15 ml/min; the nozzle air pressure was maintained at 2.5 psi; and the sonicator power was set at 0.6 watts. The distance from the nozzle tip to the surface of the stent was adjusted to be in the range of 2-3 mm and the nozzle travel speed along roller axis was 18 cm/sec.

The movement of the rollers during the indexing function was randomized and set at a 3.7:1 circumference to cycle pattern. Essentially, after a stripe of coating material was sprayed on a portion of the stent, the stent was randomly indexed to position another portion of the stent in line for an application of another stripe of coating material. Approximately 15 seconds lapsed between applications of the coating solution. The approximate width of the applied coating per stripe was 1 mm wide. 135 cycles of indexing and coating were performed on the stents. The stents were then dried under ambient conditions for at least 30 minutes after application of the final coating.

Figure 17:
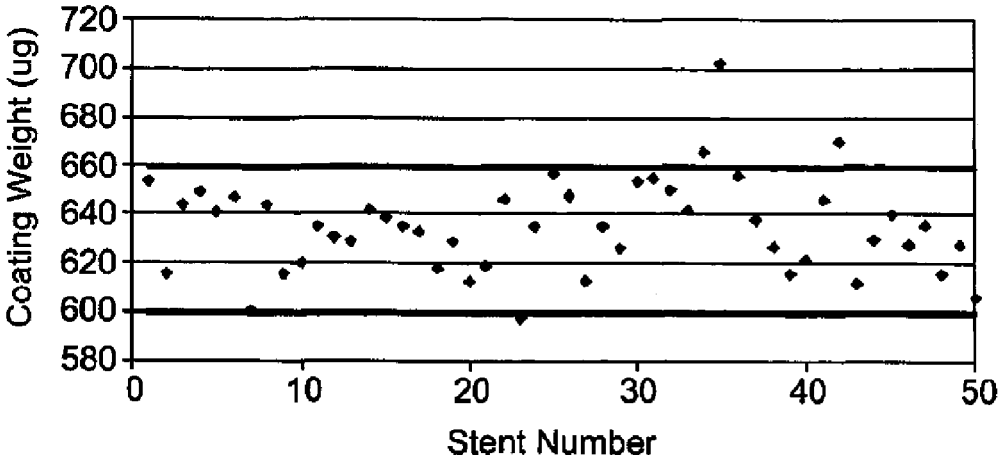
FIG. 17 is a graph illustrating the weight of applied coating material (Y axis) and the stent number (X axis) obtained from a coating procedure using the current invention.

After the coating on the stents had dried each coated stent was weighed to determine the amount of base coating applied. FIG. 17 illustrates the results of the coating process. FIG. 17 indicates that the average basecoat weight applied was 635 μg±19 μg and that 92.0% of the stents fell within the target range of 600-660 μg of coating material applied per stent.

Figure 18:
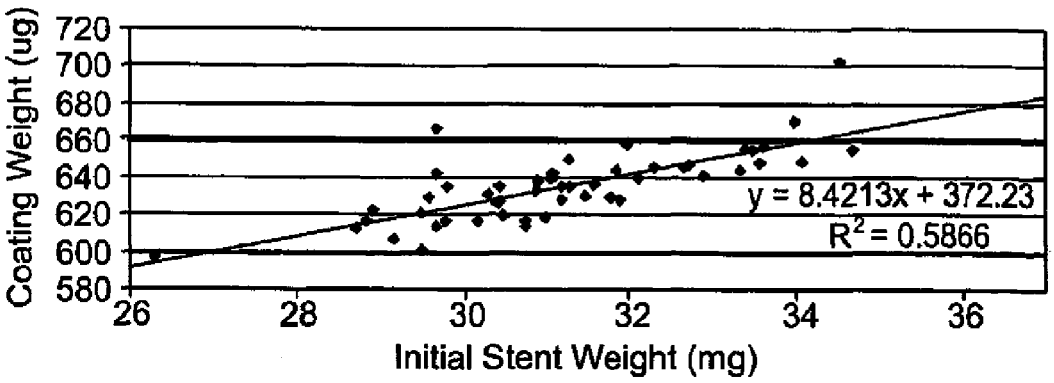
FIG. 18 is a graph illustrating the weight of applied coating material (Y axis) versus the initial stent weight (X axis) obtained from a coating procedure using the coating apparatus.

Since the starting weight varies from stent to stent, the accuracy in the amount of applied coating was also determined for each stent based on its starting weight. FIG. 18 illustrates the results and shows that variations in the amount of applied coating, as illustrated in FIG. 17, are primarily due to the variations in the starting weight of the stent and not variations in the coating process. FIG. 18 shows that as the initial stent weight increased (which correlates to an increase in coatable surface area on the stent), the amount of coating material applied to each stent increased. According to this graph, points along the line represent the target coating weights based on the initial starting weight of the stent. The data shows that, on average, the actual weight of the applied coating did not deviate more than 0.31% from the target weight based on the starting weight of individual stems.

Figure 19:
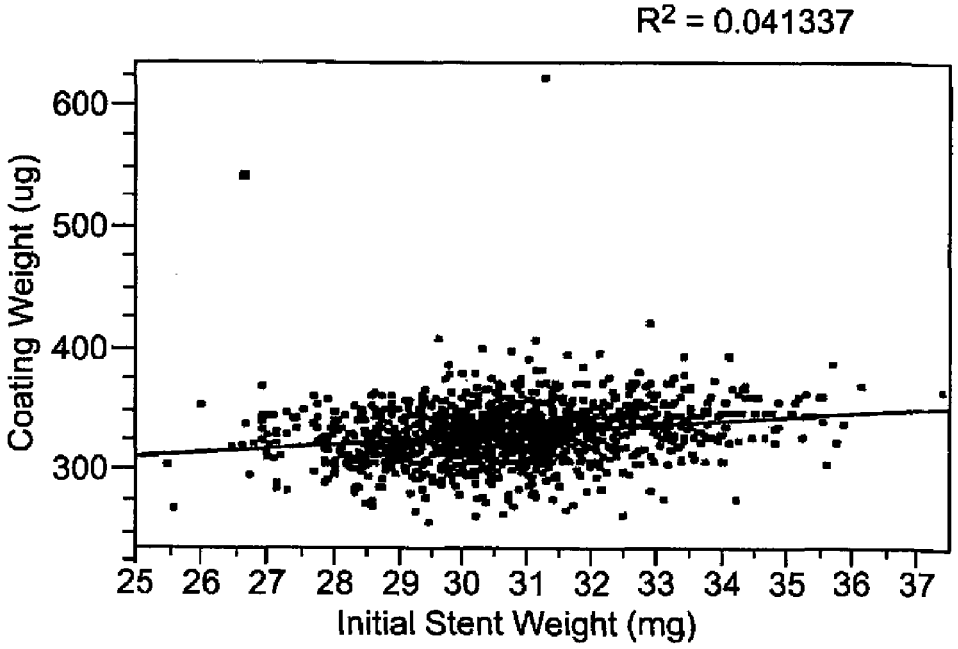
FIG. 19 is a graph showing a comparative example with the weight of applied coating material (Y axis) versus the initial stent weight (X axis) obtained from a coating procedure using a traditional coating apparatus.

The improvement in coating accuracy was assessed by comparing the results from the coating apparatus of the current invention, as detailed in FIG. 18, with coating results obtained from a traditional manual coater. FIG. 19 illustrates the initial stent weight and the amount of coating applied to each stent according to its initial weight. The data shows that using a traditional manual coater the actual weight of the applied coating, on average, deviated approximately 1.55% from the target weight based on the starting weight of individual stents.

This data represents that use of the coating apparatus of the current invention results in an improvement in coating accuracy of approximately 5 times as compared to traditional coating apparatus.

Other production lots of 18 mm by 1.5 mm stents were coated with a base coat material using the parameters described above. 86.5-95.4% of stents from these production lots were within the target range of 600-660 μg of coating material applied per stent with the average basecoat weight being 628-630 μg having a standard deviations ranging from 20-29 μg. This data indicates that the coating accuracy of the current invention is reproducible using various coatable devices.

The coated stents were microscopically examined and were found to have a consistently better appearance than traditionally coated stents.

The work time for the above-described coating procedure for 50 stents was calculated and compared to traditional manual coating methods. The time required to complete this coating process was reduced by approximately 80% relative to the traditional manual coating methods.

We claim:

1. A method for coating an implantable medical device, the method comprising the steps of:

a) placing [the] *a* medical device *having a circumference* on a device rotator, wherein the device rotator comprises a pair of rollers, the pair comprising a first roller having a first axis *that is a line about which rotation of the first roller occurs* and a second roller having a second axis *that is a line about which rotation of the second roller occurs* wherein the first and second axes are *different and* substantially parallel to each other, wherein the first and second rollers are separated by a gap, wherein the first roller, second roller, or both first and second rollers, comprise a plurality of ribs, wherein the device rotator is capable of supporting and rolling the medical device in position as supported;

b) disposing a coating material on the medical device, comprising spraying a coating material from a spray nozzle in a controlled pattern, wherein the spray nozzle is operationally arranged so that its spray is directed at the gap and so that its pattern is not wider than the medical device*, wherein disposing forms a stripe of coating material along a portion of the length of the device, wherein the stripe has a width that is a fraction of the circumference of the device*; and c) rotating the medical device by rotating at least one of the first or second rollers.

2. The method of claim 1 [comprising a] *wherein the* step of *disposing comprises* moving the spray nozzle in a direction parallel to either the first or second axis.

3. The method of claim 2 wherein the steps of disposing and moving are performed simultaneously.

4. The method of claim 1 where, in the step of rotating, the medical device comprises indexing the first roller, second roller, or both first and second rollers.

5. The method of claim 4 where, in the step of rotating, the medical device comprises randomly indexing the first roller, second roller, or both first and second rollers.

6. The method of claim 1 where the step of rotating is performed prior to the coating being dry.

7. The method of claim 1 where, in the step of disposing, the spray nozzle comprises a sonicating member.

8. The method of claim 7 where, in the step of disposing, the sonicating member includes a channel for gas flow and the spray pattern is established in part by the gas flow.

9. The method of claim 1 where, in the step of disposing, the coating material comprises polymeric, photoactivatable, biologically or pharmaceutically active compounds, or combinations thereof.

10. The method of claim 9 where, in the step of disposing, the coating material comprises a hydrophobic polymer.

11. The method of claim 9 where, in the step of disposing, the coating material comprises a polysaccharide.

12. The method of claim 1 comprising a step of regulating the humidity, temperature, or both, around the [rollable] *medical* device.

13. The method of claim 12 wherein the step of regulating is performed simultaneously with at least one step a), b), or c).

14. The method of claim 1 where, in the step of placing, the medical device has a cylindrical shape and is no greater than 5 cm in diameter.

15. The method of claim 1 where, in the step of placing, the medical device is a catheter or stent.

16. The method of claim 1 where, in the step of placing, the ribs have a shape that is wider proximal to the roller axis and narrower distal to the roller axis.

17. A method for coating a rollable device, the method comprising the steps of:

a) placing a rollable device having *a circumference and* a diameter of 10 mm or less on a device rotator, wherein the device rotator comprises a pair of rollers, the pair comprising a first roller having a first axis *that is a line about which rotation of the first roller occurs* and a second roller having a second axis *that is a line about which rotation of the second roller occurs* wherein the first and second axes are *different and* substantially parallel to each other, wherein the first roller, second roller, or both first and second rollers, comprise a plurality of ribs, wherein the first and second rollers are separated by a gap, and wherein the device rotator is capable of supporting and rolling the device in position as supported;

b) disposing a coating material on the rollable device, comprising spraying a coating material from a spray nozzle in a controlled pattern, wherein the spray nozzle is operationally arranged so that its spray is directed at the gap and so that its pattern is not wider than the device*, wherein disposing forms a stripe of coating material along a portion of the length of the device, wherein the stripe has a width that is a fraction of the circumference of the device*; and c) rotating the rollable device by rotating at least one of the first or second rollers.

[18. A method for coating a rollable device, the method comprising the steps of:

a) placing a rollable device on a device rotator, wherein the device rotator comprises a pair of rollers, the pair comprising a first roller having a first axis and a second roller having a second axis wherein the first and second axes are substantially parallel to each other, wherein the first roller, second roller, or both first and second rollers, comprise a plurality of ribs, wherein the first and second rollers are separated by a gap, wherein the device rotator is capable of supporting and rolling the device in position as supported, and wherein the gap is not wider than the device;

b) disposing a coating material on the rollable device, comprising spraying a coating material from a spray nozzle in a controlled pattern, wherein the spray nozzle is operationally arranged so that its spray is directed at the gap and so that its pattern is not wider than the device; and c) rotating the rollable device by rotating at least one of the first and second rollers wherein the coated portion of the rollable device contacts either the first or second roller prior to the coating material drying.]

*19. The method of claim 1 further comprising step d) disposing a coating on the portion of the medical device coated in step b).*

*20. The method of claim 19 further comprising repeating steps c) and d) to produce a medical device having a desired quantity of coating material.*

*21. The method of claim 1 further comprising step d) disposing a coating material on an overlapping portion or same portion of the medical device coated in step b).*

*22. The method of claim 21 further comprising repeating steps c) and d) to produce a medical device having a desired quantity of coating material.*

*23. The method of claim 1 further comprising step: d) disposing a coating material on a portion of the device that is different than the portion coated in step b.*

*24. The method of claim 23 further comprising repeating steps c) and d) to produce a medical device having a desired quantity of coating material.*

*25. The method of claim 1 wherein the medical device has a surface comprising perforations or a web structure.*

*26. The method of claim 1 wherein the first and second rollers have first and second circumferences, respectively, and the first and second circumferences are greater than the circumference of the medical device.*

*27. A method for coating an implantable medical device, the method comprising the steps of:*

*a) placing a medical device having a circumference on a device rotator, wherein the device rotator comprises a pair of rollers, the pair comprising a first roller having a first axis that is a line about which rotation of the first roller occurs and a second roller having a second axis that is a line about which rotation of the second roller occurs, wherein the first and second axes are different and substantially parallel to each other, wherein the first and second rollers are separated by a gap, wherein the first roller, second roller, or both first and second rollers, comprise a plurality of ribs, wherein the device rotator is capable of supporting and rolling the medical device in position as supported;*

*b) disposing a coating material on the medical device, comprising spraying a coating material from a spray nozzle in a controlled pattern, wherein the spray nozzle is operationally arranged so that its spray is directed at the gap and so that its pattern is not wider than the medical device; and*

*c) rotating the medical device by rotating at least one of the first or second rollers.*

* * * * *